(12) United States Patent
Lerner

(10) Patent No.: US 10,650,139 B2
(45) Date of Patent: May 12, 2020

(54) SECURING TEMPORAL DIGITAL COMMUNICATIONS VIA AUTHENTICATION AND VALIDATION FOR WIRELESS USER AND ACCESS DEVICES WITH SECURITIZED CONTAINERS

(71) Applicant: Daniel Maurice Lerner, Missouri City, TX (US)

(72) Inventor: Daniel Maurice Lerner, Missouri City, TX (US)

(73) Assignee: Daniel Maurice Lerner, Missouri City, TX (US)

( * ) Notice: Subject to any disclaimer, the term of this patent is extended or adjusted under 35 U.S.C. 154(b) by 0 days.

(21) Appl. No.: 16/222,421

(22) Filed: Dec. 17, 2018

(65) Prior Publication Data
US 2019/0258782 A1 Aug. 22, 2019

Related U.S. Application Data

(63) Continuation of application No. 16/173,384, filed on Oct. 29, 2018, now Pat. No. 10,623,384, and a
(Continued)

(51) Int. Cl.
*G06F 21/53* (2013.01)
*G06F 21/12* (2013.01)
(Continued)

(52) U.S. Cl.
CPC ............ *G06F 21/53* (2013.01); *G06F 21/121* (2013.01); *G06F 21/14* (2013.01);
(Continued)

(58) Field of Classification Search
CPC ...................................................... G06F 21/53
See application file for complete search history.

(56) References Cited

U.S. PATENT DOCUMENTS

| 4,200,770 A | 4/1980 | Hellman et al. |
| 4,218,582 A | 8/1980 | Hellman et al. |

(Continued)

OTHER PUBLICATIONS

Tokarev, A. International Search Report. Federal Institute of Industrial Property. ISA/RU. Form PCT/ISA/210. Box A-C, dated Apr. 11, 2019, Moscow, Russia.
(Continued)

*Primary Examiner* — Bradley W Holder
(74) *Attorney, Agent, or Firm* — ePatentManager; Guerry L. Grune

(57) ABSTRACT

An access control system that protects signals between one or more secure databases for various user devices to ensure proper entrance or access into secure locations by approved personnel only that utilize one or more securitized container devices. These container devices may be software containers and either real or virtual devices. Specific methods and devices for securing (primarily digital and normally two-way) communications using applications that combine securing communications for wireless/cellular phones with personnel access card readers for entry into secure locations are also described. These combined communication and access devices require using specific encryption techniques impossible to corrupt and essential to denying fraudulent or otherwise unauthorized personnel the ability to enter or access security protected devices or locations. These securitized container devices utilize both a control and trust plane for ensuring that communication signals transmitted from and data residing within these containers are not corruptible.

20 Claims, 7 Drawing Sheets

Related U.S. Application Data continuation of application No. 16/173,091, filed on Oct. 29, 2018, now Pat. No. 10,601,805, and a continuation of application No. 16/221,041, filed on Dec. 14, 2018, now Pat. No. 10,579,793, and a continuation of application No. 16/006,011, filed on Jun. 12, 2018, now Pat. No. 10,158,613, said application No. 16/173,384 is a continuation of application No. 16/006,011, filed on Jun. 12, 2018, now Pat. No. 10,158,613, application No. 16/222,421, which is a continuation of application No. 16/006,011, which is a continuation of application No. 16/005,281, filed on Jun. 11, 2018, now Pat. No. 10,154,031, application No. 16/222,421, which is a continuation of application No. 16/173,091, filed on Oct. 29, 2018, now Pat. No. 10,601,805, which is a continuation of application No. 16/005,040, filed on Jun. 11, 2018, now Pat. No. 10,154,021, application No. 16/222,421, which is a continuation of application No. 16/202,905, filed on Nov. 28, 2018, which is a continuation of application No. 16/005,134, filed on Jun. 11, 2018, now Pat. No. 10,171,444.

(60) Provisional application No. 62/610,827, filed on Dec. 27, 2017, provisional application No. 62/652,709, filed on Apr. 4, 2018, provisional application No. 62/540,352, filed on Aug. 2, 2017, provisional application No. 62/518,281, filed on Jun. 12, 2017, provisional application No. 62/518,371, filed on Jun. 12, 2017.

(51) Int. Cl.

| | | |
|---|---|---|
| *G06F 21/14* | (2013.01) | |
| *G06F 21/62* | (2013.01) | |
| *H04W 12/00* | (2009.01) | |
| *H04W 12/04* | (2009.01) | |
| *H04L 9/08* | (2006.01) | |
| *H04L 29/06* | (2006.01) | |
| *H04L 9/32* | (2006.01) | |

(52) U.S. Cl.
CPC ........ *G06F 21/6218* (2013.01); *H04L 9/0891* (2013.01); *H04L 9/3231* (2013.01); *H04L 63/101* (2013.01); *H04W 12/002* (2019.01); *H04W 12/00407* (2019.01); *H04W 12/04033* (2019.01); *H04L 2209/80* (2013.01)

(56) References Cited

U.S. PATENT DOCUMENTS

| | | | |
|---|---|---|---|
| 4,405,829 A | 9/1983 | Rivest et al. | |
| 4,424,414 A | 1/1984 | Hellmn et al. | |
| 4,578,530 A | 3/1986 | Zeidler | |
| 5,214,703 A | 5/1993 | Massey et al. | |
| 5,675,653 A | 10/1997 | Nelson, Jr. | |
| 5,825,890 A | 10/1998 | Elgamal et al. | |
| 6,157,722 A | 12/2000 | Lemer et al. | |
| 6,466,780 B1 | 10/2002 | Geiselman et al. | |
| 6,766,161 B2 | 7/2004 | Geiselman et al. | |
| 6,959,086 B2 | 10/2005 | Ober et al. | |
| 7,181,016 B2 | 2/2007 | Cross et al. | |
| 7,382,883 B2 | 6/2008 | Cross et al. | |
| 8,381,231 B2 | 2/2013 | Kacin et al. | |
| 8,462,955 B2 | 6/2013 | Ureche et al. | |
| 8,825,999 B2 | 9/2014 | Mohamed | |
| 9,094,191 B2 | 7/2015 | Avanzi et al. | |
| 9,213,858 B2 | 12/2015 | Sharma et al. | |
| 9,256,467 B1 | 2/2016 | Singh et al. | |
| 9,465,953 B2 | 10/2016 | Shasrma et al. | |
| 9,521,123 B2 | 12/2016 | Jueneman et al. | |
| 9,703,985 B1 | 7/2017 | Sanchez | |
| 9,996,380 B2 | 6/2018 | Singh et al. | |
| 10,181,231 B2 | 1/2019 | Kristensen et al. | |
| 2001/0042043 A1* | 11/2001 | Shear | G06F 21/10 705/51 |
| 2006/0206397 A1* | 9/2006 | Shear | G06F 21/10 705/28 |
| 2009/0323941 A1* | 12/2009 | Sahita | G06F 21/53 380/44 |
| 2010/0064299 A1 | 3/2010 | Kacin et al. | |
| 2010/0174652 A1* | 7/2010 | Shear | G06F 21/10 705/53 |
| 2012/0198538 A1 | 8/2012 | Spring et al. | |
| 2016/0050272 A1* | 2/2016 | Raduchel | H04L 67/1095 709/204 |
| 2016/0162320 A1 | 6/2016 | Singh et al. | |
| 2016/0217303 A1* | 7/2016 | Kasper | H04L 63/061 |
| 2016/0342786 A1* | 11/2016 | Gerebe | G06F 21/52 |
| 2016/0358397 A1 | 12/2016 | Kristensen et al. | |
| 2017/0012642 A1 | 1/2017 | Declercq et al. | |
| 2017/0090800 A1* | 3/2017 | Alexandrovich | G06F 13/4068 |
| 2018/0167217 A1* | 6/2018 | Brady | G06F 8/65 |
| 2018/0173502 A1* | 6/2018 | Biskup | G06F 8/30 |
| 2018/0205708 A1* | 7/2018 | Kurian | G06F 21/32 |
| 2019/0213319 A1* | 7/2019 | Gerebe | H04L 63/08 |
| 2019/0251278 A1* | 8/2019 | Kalinichenko | H04L 63/102 |

OTHER PUBLICATIONS

Tokrev, A. Written Opinion of the International Searching Authority. Federal Institute of Industrial Property. ISA/RU. Form PCT/IS/237. Box No. V and Supplemental Box, dated Apr. 11, 2019, Moscow, Russia.

* cited by examiner

SECURING TEMPORAL DIGITAL COMMUNICATIONS VIA AUTHENTICATION AND VALIDATION FOR WIRELESS USER AND ACCESS DEVICES WITH SECURITIZED CONTAINERS

PRIORITY STATEMENT

This application is a nonprovisional conversion of and takes priority under 119(e) of U.S. Provisional Application No. 62/652,709, filed Apr. 4, 2018 entitled "Securing Temporal Digital Communications Via Authentication and Validation for Wireless User and Access Devices for Software Containers".

This application is also a continuation of U.S. Nonprovisional application Ser. No. 16/221,041 filed Dec. 14, 2018 and entitled, "Managed Securitized Containers and Container Communications", which is a nonprovisional conversion of US Provisional Application number U.S. Provisional Application No. 62/610,827, entitled "Managed Securitized and Encrypted Containers and Container Communications", filed Dec. 27, 2017.

This application is also a continuation of U.S. application Ser. No. 16/173,091 filed Oct. 29, 2018, which is a continuation of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018, which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

This application is also a continuation of U.S. Nonprovisional application Ser. No. 16/202,905, filed Nov. 28, 2018 which is a continuation of U.S. Nonprovisional application Ser. No. 16/005,134, filed Jun. 11, 2018, granted as U.S. Pat. No. 10,171,444 on Jan. 1, 2018, and entitled "Securitization of Temporal Digital Communications with Authentication and Validation of User and Access Devices" which is a nonprovisional conversion of US Provisional Application entitled "Securitizing Temporal Digital Communications Via Authentication and Validation for Wireless User and Access Devices" with Ser. No. 62/518,337, filed Jun. 12, 2017.

Further, Ser. No. 16/005,134, filed Jun. 12, 2018, granted as U.S. Pat. No. 10,171,444 on Jan. 1, 2019, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

In addition, this application is also a continuation of and takes priority under 35 USC § 120 of U.S. patent application Ser. No. 16/173,384, filed Oct. 29, 2018, which is a continuation of application Ser. No. 16/006,011, filed Jun. 12, 2018, granted as U.S. Pat. No. 10,158,613 on Dec. 18, 2018, which is a nonprovisional conversion of and takes priority under 119(e) of U.S. Provisional Application No. 62/540,352, entitled "Combined Hidden Dynamic Random Access Devices and Encryption Systems Utilizing Selectable Keys and Key Locators for Communicating Randomized Encrypted Data Together with Sub-Channels and Executable Coded Encryption Keys", filed Aug. 2, 2017.

Further, Ser. No. 16/006,011, filed Jun. 12, 2018, granted as U.S. Pat. No. 10,158,613 on Dec. 18, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

All applications are hereby incorporated by reference in their entirety.

FIELD OF THE INVENTION

The present disclosure relates to the security of communications, and more particularly to a system that conceals and reveals signals as required between one or more secure databases for personal security cards either in combination with or between cellular phones to ensure proper entrance or access into secure locations by only approved personnel. Methods and devices for securing (primarily digital and normally two-way) communications using applications that combine securing those communications for wireless/cellular phones with personnel access card readers (or other devices designed to receive security clearance for entry into secure locations) are not yet well established. These combined communication and access devices require using specific techniques essential to denying fraudulent or otherwise unauthorized personnel with the ability to enter or access security protected devices or secure locations.

The present disclosure also further relates to randomized securitization of communications, and more particularly to a system that protects signals between devices to ensure that the communications with and from securitized containers are discoverable by only designated third parties. Methods and devices for securitization of these (primarily digital and normally two-way) communications to, from, and within securitized containers using applications that may be combined with authorization and validation for receiving, storing, and retrieval of electronic, optical, and/or electro-optical communications in the form of voice, data, or optical transmissions, are also included. These data and data communications require special techniques essential to denying fraudulent or otherwise unauthorized third parties with the ability to access sealed transmissions used with data at rest as well as for data on the move and specific to data to, from and within securitized containers that can be software securitized containers that are either real or virtual devices.

The present disclosure includes devices and a system that is specifically suited for data transmission applications that require a need for discrete communications, preserving privacy of information, electronic commerce transactions, electronic mail communications all required for solving security issues associated with securitized containers.

BACKGROUND

Access control systems such as personnel security cards to limit access to enclosed areas such as buildings, rooms within buildings, or fenced-in regions to only those personnel who have permission to enter are often employed. Conventional access control systems include access card readers at doors of the secured building. People who have permission to enter the building are often provided with an access control card that can be read by access card readers. The card reader reads information from the card, and transmits the information to a control panel, which determines whether the entrance (such as a door) should be unlocked. If the door should be unlocked (i.e., the card is associated with a person who has permission to enter), the control panel then sends a signal to the locking mechanism of the door, causing it to unlock.

Conventional access control systems have several drawbacks and fail to take advantage of more recent and advanced technologies.

For example, many conventional systems utilize radio frequency identification devices (RFIDs) for identification of the personal security card to the access control system. The access card reader includes an RFID transceiver, and the access card includes an RFID tag or transponder. The RFID transceiver transmits a radio frequency query to the card as the card passes over it. The transponder includes a silicon chip and an antenna that enables the card to receive and respond to the RF query. The response is typically an RF signal that includes a pre-programmed identification (ID) number. The card reader receives the signal and transmits the ID number to the control panel via a wire connection. Conventional card readers are not very sophisticated. These card readers may perform some basic formatting of the identification data prior to sending it to the control panel, but are generally unable to perform more sophisticated functions with regard to securing digital communications.

The control panel is typically mounted on a wall somewhere in the building. The control panel conventionally includes a bank of relays that are each controlled by a controller device. The controller device accesses memory to determine whether the identification number received from the card reader is recognized and valid. If so, the controller causes the associated relay to open (or close) and thereby sends a signal to the door lock, which, if the signal is proper, causes the lock to enter the unlocked state. The lock typically remains unlocked for a specified amount of time.

Conventional control panels also have several deficiencies. In many instances, control panels consume a relatively large amount of space in relation to the number of doors they control. A control panel typically includes a specified number of relay banks, with each bank uniquely associated with the door it controls. For example, a control panel may have eight relay banks to control eight doors. Such a control panel could easily take up a 2 square foot area when mounted on a wall. If more than eight doors need to be controlled, then an additional control panel must be installed.

In addition, the "closed" architecture of conventional control panels make them inflexible, costly to maintain, and not user friendly. The closed architecture of the conventional control panels means that their design, functionality, and specifications are not disclosed by the manufacturers or owners. In addition, the control panel design is typically very complex, and specialized for a particular purpose, which renders them inaccessible by a typical building owner who has no specialized knowledge. As a result, when a control panel fails or needs to be upgraded, the building owner must call a specialized technician to perform maintenance or upgrading. The monetary costs associated with a technician's services contribute to excessive maintenance costs. In addition, a great deal of time is wasted waiting for the service technician to arrive.

Specific security concerns for cellular phones often deal with the content of the communication itself (often protected by encryption methods), the integrity of the communication (often protected by error-checking and anti-virus software), and authorized access to the communication (often protected by account codes and passwords). For the purposes of this application the definition of mobile or smart phones is as follows;

A mobile phone is a portable telephone that can make and receive calls over a radio frequency link while the user is moving within a telephone service area. The radio frequency link establishes a connection to the switching systems of a mobile phone operator, which provides access to the public switched telephone network (PSTN). Most modern mobile telephone services use a cellular network architecture, and, therefore, mobile telephones are often also referred to as cellular telephones or cell phones. In addition to telephony, $21^{st}$ century era mobile phones support a variety of other services, such as text messaging, MMS, email, Internet access, short-range wireless communications (infrared, Bluetooth), business applications, gaming, and digital photography. Mobile phones which offer these and more general computing capabilities are referred to within this disclosure as "smartphones".

Computer and associated cellular phone networks have been compromised by determining authorized account codes and passwords, thereby gaining access to proprietary two-way communications for obtaining information and additional capabilities. Attempts to combat these unauthorized communications has taken many forms. Interception of two-way communications of private (and often individual) conversations by government agencies has become commonplace.

One security measure implemented in typical communication systems is the authentication of communicating devices at registration, initiation or reception of the communication. Authentication is viewed as the process of confirming the identity of the communicating device, perhaps by transmission and reception of an account or identification code and a password. In applications where the communicating device is mobile, authentication often requires communication between or through a plurality of communicating devices or networks in order to verify the identity of the communicating device and often the user of the communicating device.

Another serious flaw with existing cellular telephone systems is referred to as the "false mobile station" syndrome. It is presently possible to copy the entire memory contents of a mobile station and to use that information to manufacture clones that can demand and receive service from the network. Cellular phones may be cloned by reading the entire memory contents of the phone, including its identification codes, "secret" keys, internally stored personal identification codes, signatures, etc., and writing the same codes into any number of similar "clone" phones. The cloning procedure can become quite sophisticated and may include software modifications which replace physically stored information with electronically stored information so that a number of stored mobile station identities may be cyclically rotated within one fraudulent mobile station and used to imitate several authentic mobile stations.

Many communication systems, including cellular telephone networks and personnel security cards having authentication or authorization systems and comprise a vast number of distributed communicating devices that transmit data to a central computer system. The central communication system is in charge of determining whether to allow the communication to go through or not. The central computer system may execute an authorization algorithm to determine if the security card has a valid account or identification number, if there is an available bio-identifier for the individual and, perhaps, if a valid personal identification number has been given or entered. However, sophisticated "hackers" have been able to duplicate valid identification numbers and determine one or more personal identification numbers.

Password protection provides a limited degree of security, primarily protecting a communication from access by persons who casually encounter the file, but this security can also be violated. Encryption is perhaps the most secure means for preventing outsiders from obtaining the content of the communication and, therefore, is in widespread use by corporations throughout the world for many or all of their electronic transactions.

However, the security of even the most sophisticated encryption methods remains jeopardized by the growing computing power available to individuals and groups. Complex encryption algorithms using 64 bit keys having $2^6$ (about $1.8 \times 10^{19}$) possible keys can become marginalized in terms of protection against outside access to the communication.

Therefore, there is a need for improved methods of securing communications between two or more communicating devices and/or users. More particularly, there is a need for devices and methods to ensure prevention of personnel security cards and cellular phones as well the content of the communication. Having a cellular or "smart" phone (smart phones are also those that have embedded memory and microprocessors) that combines security card-type access together with secured cellular phones to ensure proper secured access to users is also important. It would also be desirable to provide devices with a method for a simple measure of detecting the use of "cloned" communicating devices. Furthermore, it would be especially desirable if the method did not require any significant physical modifications to existing communicating devices, but rather are employed by the addition or modification of software.

To solve the above mentioned problems and drawbacks, the inventions disclosed in U.S. Pat. Nos. 6,466,780, 6,766, 161, and 6,466,780 and the associated details are hereby incorporated by reference into the present disclosure in its entirety and for all proper purposes.

In addition, regarding use of securitized containers, it is known that software development is a rapidly-changing field that's moving faster than ever. Historically, software has been built in a "Waterfall" way, meaning that software products are defined, developed, tested, released and maintained in sequential order. The Waterfall days have essentially ended because the pace of technology innovation and business continue to accelerate, so developers have less time than ever to get a product or product upgrade to market.

The environment in which software runs has become more complex. Decades ago, there were few operating systems and not many PC manufacturers. Now, many companies are building laptops, tablets, phones, and other everyday products that have computing capabilities. Those devices run on a myriad of networks and communicate with each other across those networks. As consumers, we don't care about all the technical details that make up the environment in which the software we use runs, we just want to do what we want, when we want to do it.

The faster product cycles and increased environmental complexity have forced software teams to adopt new ways of working. The new work styles ensure that better quality products can be delivered faster.

For the last couple of decades, increasing numbers of software teams have become "Agile." Essentially, Agile methodologies enable software teams to deliver better quality software faster. To do that, they break down what used to be huge software programs into much smaller parts. While it might seem counterintuitive, Agile teams can actually accomplish more in less time than Waterfall teams.

The reason Agile methods enable faster delivery of better quality software is because small pieces have smaller setbacks and larger pieces have larger setbacks. For example, companies have spent a year or two building software products that cost millions of dollars only to discover that it doesn't align with a market requirement or the software quality is poor.

By doing small things rapidly, Agile teams can "fail fast" and fix their mistakes as they go. Agile teams also benefit from a constant customer feedback loop which allows them to manage their time and budgets more effectively. Another characteristic of Agile teams is that they're cross-functional. Rather than doing their specific jobs and not really communicating with other functions (which is typical of Waterfall practices), they're working together to set priorities and remove inefficiencies from their processes.

"DevOps" combines software development and operations. The trend started to gain momentum in the early 2000's because there were often disconnects between how a developer thinks the software he's building will operate in the real world and how that software actually works in the real-world.

Developers and operations teams don't naturally come together, however. They have to agree to cooperatively embrace DevOps. Historically, the two groups have had a contentious relationship because developers want access to "production" systems so they understand how their software will behave in the real world. However, operations do not want to give developers access to production systems because their business runs on them. One simple misconfiguration could cause all or part of a business to be "shut down."

To solve this problem, some vendors built software tools that allow developers to emulate production systems, but real and fictional environments tend to differ. Cloud computing helps to resolve the differences because actual and test systems can be configured more identically. (Basically, a "cloud" is a massive compute and storage environment that businesses can rent on a usage basis. Slowly, but surely, businesses across industries are moving to the cloud because they're finding it very difficult if not impossible to continue building and maintaining their own information technology (IT) infrastructures in today's fast-changing business world).

Clouds are increasingly important to software development, because more and more applications are running in clouds, such as mobile phone applications, Facebook, Google, and Amazon.

Continuous delivery is a software development method that builds upon the concepts associated with both Agile and DevOps Continuous delivery works faster than either Agile or DevOps can on their own. It's necessary, because software delivery cycles are continuing to shrink. There are several reasons why the cycles are shrinking including the two biggest factors, customer expectations and disruptive companies that have always operated online or in the cloud ("digital natives").

The most progressive software companies are increasing employing continuous delivery, if not continuous deployment, which moves at an even faster pace. These companies aren't delivering software once a year, once a quarter or even once a month. They're releasing software weekly, daily, or in most cases, several times per day. How often a company releases software really depends on its business model and its customers' expectations. However, they are all under pressure to deliver software faster.

This acceleration and speed at which software development is occurring is associated with an increased loss of securitization.

When it takes software a year or two to go from concept to product delivery, there's more time for quality and security related testing. As software cycles diminish, there is less time for quality and security checks. Shortcuts and oversights can be devastating. For example, the Equifax breach discovered in 2017 was the result of failing to update ("patch") certain open source software in a timely manner. The patch had been available for the six months leading up to the breach. Had Equifax installed the patch, that particular hacking incident wouldn't have occurred when it did or perhaps not at all.

Hackers and software "pirates" expect software developers to make mistakes and take shortcuts. They also expect to find holes in software testing, and they are betting on the fact that even security experts don't understand all the vulnerabilities. Given the amount of software that powers our modern world and the increasing speed at which that software is being developed, security breaches will continue to occur. Unfortunately, security breaches are becoming increasingly common and increasingly severe.

The present disclosure was developed so that software developers can secure the products they're building without spending any extra time, which makes it ideal for Agile and DevOps teams whether they're performing Continuous Delivery or not. If they want their software or device to communicate with any other piece of software or device securely, the present disclosure addresses this need.

Given the pervasive nature of software today, companies and individuals are constantly at risk. Although it's not apparent to most people, software runs almost everything you can think of from manufacturing floors to airplanes, cars, TVs and children's' toys. All of the software developers, and the organizations for which they work, are responsible for the quality of the software they're building. Security is a critical part of quality, and it's becoming increasingly important.

Securitized containers are a solution to the problem of how to get software to run reliably when moved from one computing environment to another. These containers can be utilized for example for anything including a software developer's laptop to a test environment, from a staging environment into production, as well as from a physical machine in a data center to a virtual machine in a private or public cloud.

Problems arise when one or more supporting software environments are not identical. For example if a software developer or architect is going to test using Python 2.7, (Python is an interpreted, object-oriented programming language similar to PERL, that has gained popularity because of its clear syntax and readability) and then run the executable program on Python 3 in production, there is a degree of probability that something unexpected will occur. Another issue that may arise, is if the developer relies on the behavior of a certain version of an SSL library (SSL is a programming library that secures communications. SSL is a standard way of establishing communication between two devices over a network where others could be "listening in" on the conversation) but another one is installed instead. The developer could perform testing on Debian (Debian is a Unix-like computer operating system that is composed entirely of free software, most of which is under the GNU General Public License and packaged by a group of individuals participating in the Debian Project) and production is performed using a Red Hat operating system. Again, the results could be and often lead to unexpected/unintended consequences. These issues are not confined to software malfunctions but network topology might not match and/or the security policies and storage might be different. In all cases, however the software still has to perform properly and as initially intended.

Securitized containers are utilized to solve these issues. Put simply, a container consists of an entire runtime environment: an application, plus all its dependencies, libraries and other binaries, and configuration files needed to run (execute) it, bundled into one package. By containerizing the application platform and its dependencies, differences in OS (operating system) distributions and underlying infrastructure are abstracted away.

There is a difference between containers and virtualization technology. With virtualization technology, the package that can be passed around is a virtual machine, and it includes an entire operating system as well as the application. A physical server running three virtual machines would have a hypervisor and three separate operating systems running on top of it.

By contrast, a server running three containerized applications using securitized containers runs a single operating system, and each container shares the operating system kernel with the other securitized containers. Shared parts of the (OS) operating system are read only, while each software container has its own mount (i.e., a way to access the container) for writing. That means the securitized containers are much more lightweight and use far fewer resources than virtual machines.

Other benefits of implementing securitized containers includes the fact that a container may be only tens of megabytes in size, whereas a virtual machine with its own entire operating system may be several gigabytes in size. In this instance, a single server can host far more containers than virtual machines.

Another major benefit is that virtual machines may take several minutes to boot up their operating systems and begin running the applications they host, while containerized applications can be started almost instantly. This means that securitized containers can be instantiated in a "just in time" fashion when they are needed and can disappear when they are no longer required, freeing up resources on their hosts.

A third benefit is that containerization allows for greater modularity. Rather than run an entire complex application inside a single software container, the application can be split into modules (such as the database, the application front end, etc.). This is the so-called "microservices approach". Applications built and provided in this manner are easier to manage because each module is relatively simple, and changes can be made to modules without having to rebuild the entire application. Because securitized containers are so lightweight, individual modules (or microservices) can be instantiated only when they are needed and are available almost immediately.

A company known as "Docker" has become synonymous with software container technology because it has been the most successful at popularizing it. However, software container technology is not new; it has been built into Linux operating systems in the form of LXC for over 10 years, and similar operating system level virtualization has also been offered by FreeBSD jails, AIX Workload Partitions and Solaris Containers.

Standardization of securitized containers began in earnest in 2015, with another company known as CoreOS, which produced its own App Container Image (ACI) specification that was different from Docker's container specification, and at the time there was a risk that the newly-popular container movement would fragment with rival Linux container formats.

However, later in the same year, an initiative known as the "Open Container Project" was announced, and later renamed as the Open Container Initiative (OCI). Run under the auspices of the Linux Foundation, the purpose of the OCI is to develop industry standards for a container format and container runtime software for all platforms. The starting point of the OCP standards was Docker technology, and Docker donated about 5 percent of its codebase to the project to get started. Additional project sponsors include; AWS, Google, IBM, HP, Microsoft, VMware, Red Hat, Oracle, Twitter, and HP as well as Docker and CoreOS The idea of the OCI is to ensure that the fundamental building blocks of software container technology (such as the container format) are standardized so that all software developers and architects can take advantage of them. This initiative would then provide the ability to reduce spending resources developing competing software container technologies so that organizations can focus on developing the additional software needed to support the use of standardized securitized containers in an enterprise or cloud environment. The type of software needed includes A major concern and major objective of the present disclosure involves the fact that many people believe that securitized containers are less secure than virtual machines. This is due, in part, to the possibility that if there is a vulnerability in the container host kernel, this vulnerability can provide a way into the securitized containers that share the host kernel. This issue is also true for a hypervisor. A hypervisor is a virtual machine monitor (VMM) that is computer software, firmware or hardware that creates and runs virtual machines. A computer on which a hypervisor runs one or more virtual machines is called a host machine, and each virtual machine is called a guest machine. However, because a hypervisor provides far less functionality than a Linux kernel (which typically implements file systems, networking, application process controls and so on) it presents a much smaller attack "surface" for a virus to be implanted or to access sensitive data. In the last couple few years a great deal of effort has been devoted to developing software to enhance the security of containers. For example, Docker (and other container systems) now include a signing infrastructure allowing administrators to sign container images to prevent untrusted containers from being deployed.

However, it is not necessarily the case that a trusted, signed container is secure to run, because vulnerabilities may be discovered in some of the software in the container after it has been signed. For that reason, Docker and others offer container security scanning solutions that can notify administrators if any container images have vulnerabilities that could be exploited.

More specialized container security software has also been developed. For example, Twistlock offers software that profiles a container's expected behavior and "whitelists" processes, networking activities (such as source and destination IP addresses and ports) and even certain storage practices so that any malicious or unexpected behavior can be flagged.

Another specialist container security company known as Polyverse takes a different approach. It takes advantage of the fact that containers can be started in a fraction of a second to relaunch containerized applications in a known "good" state every few seconds to minimize the time that a hacker has to exploit an application running in a software container.

Using the devices and techniques of the present disclosure, developers can start securing their applications within a relatively short period of time. They won't have to configure anything or know anything about security for the system to properly operate. Developers can simply wrap their application up in a software container which is like placing personal items in a portable storage container that's under lock and key.

However, unlike storage containers, the securitized containers of the present disclosure are able to communicate with each other securely via an encrypted link.

The present disclosure provides software developers with a new and better way to secure whatever software they're building so when that software communicates with either a copy of itself or other types of software, including the software resident in various types of devices, the data is kept safe. More specifically, the present disclosure describes the use of the first known context-free and natively-secure securitized containers that enable software developers the ability to take ownership of application data security. Context free means that developers do not have to rely on a particular vendor/platform (i.e. Amazon, IBM, Cisco, etc.) and is independent of the type of container used. These devices and system are "natively secure" in that they are built into the actual structure of the container itself. Securitization and encryption occurs at the transport layer such that the application developers are writing applications that create connections to the rest of the communications world at the transport layer. In this manner, the application developers/writers who create the applications can take ownership of the security themselves instead of handing it off to someone else in the operation or to some external router. Developers using the system disclosed are now in full control of security in that the developer is specifying the data security and the data security is being supplied to their application as they determine and as they complete their task(s). Companies developing software applications such as Layer 3 (Norcross, Ga.) and Technologent (Irvine, Calif.) are anxious to deploy this new development. They see the system as the ability to offer a ubiquitous capability to provide security for specific platforms. Utilizing the devices and system of the present disclosure, any developer can secure communication between securitized containers across disparate scheduling and orchestration platforms, IaaS (internet as a service) services, transport-layer security protocols, and on-premises or hybrid environments using Docker-compatible hypervisors. Such hybrid IT environments include colocation (hypervisor) and AWS ECS.

This system provides DevOps teams with a method to build, deploy and run secure container applications without the costs associated with legacy security strategies.

Using securitized containers will also become more ubiquitous due to the new securitization techniques disclosed herein because the legacy security strategies will either use an appliance (routers, servers, etc.) which will contain the presently disclosed security system or because legacy security can be improved by running a small program (software routine) that can be included with (added to running on) the actual legacy equipment. This small program is a symmetric TLS library (currently written in Python) that encrypts and decrypts egress and ingress layer 4 traffic (respectfully) using configurable symmetric encryption TLS cipher suites. This program is often embedded (the code) into the container. The library is 2.5 times faster than the most used open source python crypto wrapper, meaning that cross-platform networks can now be effectively secured without suffering unacceptable latencies.

Further description of layer 4 traffic is provided below. This software routine can be installed on another piece of computer equipment and is both the library and the intercept of the present disclosure added in the form of a software router.

Currently, legacy systems are supposed to provide secure communications via IP SEC- or IP security. IP security is a layer 3 protocol that supplies secure channels/tunnels between IP addresses. In this case, tunnels themselves may carry signals that may include channels and tunnels may carry channels or tunnels may carry signals through other tunnels. Here, a data channel is an information route with associated circuitry that passes data between systems or parts of systems. Tunnels in this case also refers to tunneling and is a mechanism used to ship a foreign protocol across a network that normally would not support that protocol. In either case, a tunnel can be used to penetrate through obstructions (such as firewalls that would be otherwise impenetrable) where channels may not provide this feature. A significant issue that the present disclosure addresses includes the fact that IP SEC is a difficult to configure and a difficult to keep operating software that is normally inserted into an appliance. There is also difficulty with operating IP SEC as there is a limited amount of encryption security using the standards available. The cost of IP SEC is also relatively high and normally provided by very few vendors including CISCO. IP SEC normally involves scheduling and orchestration platforms—this is for network servers and is a form of load balancing that requires computer resource scheduling. Orchestration involves the location where the code (in this case the security code) is being executed. To date, inter-container communications have not been addressed adequately by existing container orchestration frameworks and protocols. ICEMicro changes that by providing developers with a natively secure container image to package application code. Since secure communications are an inherent feature, any two ICEMicro containers can communicate securely "out of the box."

Another significant issue is the disparity caused when different network resources operate on different companies' clouds, often causing extreme communication mishaps. Currently the solution has been that disparate regions also function on different clouds (e.g. Amazon UK vs Amazon, USA) and a current method to get these two disparate entities to communicate with each other is to get another resource from Amazon for both ends and pay for a bridge between one application on Amazon US to one or more applications with Amazon UK. This requires adding another virtual device that has to run on the Amazon platform. Either Amazon provides this service or you pay Cisco for their Virtual Router. Another possibility is that the developers must write the code themselves which becomes embedded on both ends. In this last instance, the developer must now manage their own communication security has to develop new code. Normally, as no developer wants to purchase Cisco's IP SEC or use Amazon's or some other software equivalent. Today Cisco and its affiliates utilize a software version of IP SEC which is encrypted and Amazon and others do not have this security application. In short, developers are utilizing hybrids that may or may not provide the security they think they are applying to newly developed software using securitized containers.

In contrast, the present disclosure utilizes a level 4 securitization technique for TLS (transport layer security). Level 4 refers to layers that are in a communications stack which from bottom to top is as follows:

Communication Layer (1): Wires and connectors

Communication Layer (2): Software running over Layer 1—such as token ring or ethernet Communication Layer (3): Wireless area networks—if wireless connecting from one computer or other hardware device to another IP address—such as the internet—IP address to IP address communications.

Communication Layer (4): As communications go through the stack from top to bottom, where the manner of transport is irrelevant this last layer becomes the security layer, which presently is where IP SEC resides and is executed.

This "Layer 4" is known as the transport layer security level or TLS—where security is occurring at the transport layer. Here is where the communications "traffic" is routing from or to communications ports. Typically layer 4 is attached to the application itself and provides logical connections between applications. This, understandably is why TLS security is critical. The present disclosure describes devices and systems that places the TLS security into the structure of the container itself. In this manner, a developer can provide any application immediate security within the container using the "ICEMicro security devices and systems". The system allows the developer to inform the container(s) what connections are allowed between transport layer(s) and where the "ICEMicro" securitization and/or encryption should be placed. This technique creates and provides a "tunnel" that now exists from one container to a different container and utilizes its own dynamic key and with its own tunnel. The ICE system may provide multiple tunnels as there are 16 bits of tunnels which equates to 65,535 ports, all of which can possess their own keys. The keys are dynamically changed by the "ICE" Library. In addition, each tunnel can go to any other location (including other containers), all capable of running individual independent sets of security on their data transmissions. Developers will gain significant speed and efficiency using the "ICE" system, as securing communications between two containers is accomplished as quickly as applications can be created. ICEMicro does not require additional development overhead or network security expertise.

Presently, developers who use TLS security don't get this level of security from other platforms provided by other vendors. Unlike most current strategies, ICEMicro does not depend on the transport layer for data security. However, it is compatible with any transport layer security protocol. Transport layer security protocol vulnerabilities are well known. As quickly as protocol upgrades are deployed, hackers exploit new vulnerabilities. Networks deploying legacy TLS pose even higher risks. ICEMicro is agnostic to the TLS protocol and natively secures the communications between containers within legacy or greenfield environments, limiting successful TLS hacks access to encrypted data only. Essentially, ICEMicro renders TLS unnecessary.

The devices and system of the present disclosure utilize running dynamic ephemeral (temporary) keys as another layer of protection provided by the encryption tools (also described herewithin). The present disclosure describes an "ICEMicro" version of a TLS protocol, which can be run on/or embedded in containers (or hybrid systems). In addition, the present disclosure supports container compatible Hypervisors. Hypervisors are layers of software located between the actual computer systems and the operating systems—which enables virtual operating systems and controls instruction sets to operate on the same computing platforms developers utilize during software development. In addition, the Hypervisor translates the capabilities of some hardware into a portion of a standardized virtual hardware and controls the access to that virtual hardware.

The ICEMicro devices and system of the present disclosure provides security bridges to containers directly with built-in security DASA encryption. These are security bridges for communications between containers. The system also provides for communications from one container to a legacy network/device or from a legacy network/device to another legacy or any other network or communicating device, whether networked or not. Dynamic Encryption Technology eliminates vulnerabilities caused by exposure of any single encryption key by continuously changing encryption keys and keeping the keys synchronized in a fault-tolerant manner.

Perpetual Authentication Technology uses multiple virtual channels or tunnels for encryption so that in the event one channel or tunnel is compromised, the other tunnels maintain encryption integrity. Together, these technologies not only eliminate the single point of failure problem created by having keys exposed through brute force, side channel, or other types of attack, but do so with very low latency and performance overhead. Whether at rest or in-motion, the encryption processes described ensures communications data (and all associated signals) remains safe, secure and uncompromised.

Up to this point, unmanageable encryption overhead has prompted developers to transfer encryption responsibilities to business operations, ultimately inflating costs.

The present disclosure and associated invention provides technology that abstracts container services into a Trustplane. The Trustplane secures data in transit simply and reliably, allowing developers to ensure data integrity without concern for Data Plane and Control Plane configurations or security vulnerabilities. With applications running in natively-secured ICEMicro containers, VPNs are no longer the vulnerable and expensive chokepoint that limits multi-environment deployments.

No known software container security systems, however, exist that will perform the use of singularly or in combination hidden dynamic random access devices with an encryption system utilizing selectable keys and key locators for communications using randomized encrypted data together with sub-channels and executable coded encryption keys.

As it is known in cryptology, encryption techniques (codification) using standard and evolving algorithms are used so that data exposed to undesirable third parties are encrypted making it difficult (and intended to be impossible) for an unauthorized third party to see or use it. Usually, for encryption, the term 'plaintext' refers to a text which has not been coded or encrypted. In most cases the plaintext is usually directly readable, and the terms 'cipher-text' or 'encrypted text' are used to refer to text that has been coded or "encrypted". Encryption experts also assert that, despite the name, "plaintext", the word is also synonymous with textual data and binary data, both in data file and computer file form. The term "plaintext" also refers to serial data transferred, for example, from a communication system such as a satellite, telephone or electronic mail system. Terms such as 'encryption' and 'enciphering', 'encrypted' and 'ciphered', 'encrypting device' and 'ciphering device', 'decrypting device' and 'decipher device' have an equivalent meaning within cryptology and are herein used to describe devices and methods that include encryption and decryption techniques.

There is an increasing need for security in communications over public and private networks. The expanding popularity of the Internet, and especially the World Wide Web, have lured many more people and businesses into the realm of network communications. There has been a concomitant rapid growth in the transmission of confidential information over these networks. As a consequence, there is a critical need for improved approaches to ensuring the confidentiality of private information and especially for securitized containers.

Network security is a burgeoning field. There are well known encryption algorithms, authentication techniques and integrity checking mechanisms which serve as the foundation for today's secure communications. For example, public key encryption techniques using RSA and Diffie-Hellman are widely used. Well known public key encryption techniques generally described in the following U.S. Pat. No. 4,200,770 entitled, Cryptographic Apparatus and Method, invented by Hellman, Diffie and Merkle; U.S. Pat. No. 4,218,582 entitled, Public Key Cryptographic Apparatus and Method, invented by Hellman and Merkle; U.S. Pat. No. 4,405,829 entitled Cryptographic Communications System and Method, invented by Rivest, Shamir and Adleman; and U.S. Pat. No. 4,424,414 entitled, Exponentiation Cryptographic Apparatus and Method, invented by Hellman and Pohlig. For a general discussion of network security, refer to Network and Internetwork Security, by William Stallings, Prentice Hall, Inc., 1995.

In spite of the great strides that have been made in network security, there still is a need for further improvement. For example, with the proliferation of heterogeneous network environments in which different host computers use different operating system platforms, there is an increasing need for a security mechanism that is platform independent. Moreover, with the increasing sophistication and variety of application programs that seek access to a wide range of information over networks, there is an increasing need for a security mechanism that can work with many different types of applications that request a wide variety of different types of information from a wide variety of different types of server applications. Furthermore, as security becomes more important and the volume of confidential network transactions expands, it becomes increasingly important to ensure that security can be achieved efficiently, with minimal time and effort.

The creation of proprietary digital information is arguably the most valuable intellectual asset developed, shared, and traded among individuals, businesses, institutions, and countries today. This information is mostly defined in electronic digital formats, e.g., alphanumeric, audio, video, photographic, scanned image, etc. It is well known that a large number of encryption schemes have been used for at least the last 100 years and deployed more frequently since the onset of World Wars I and II. Since the beginning of the cold war, the "cat and mouse" spy missions have further promulgated the need for secure encryption devices and associated systems.

Simultaneously, there has been an increased need for mobility of transmissions including data and signals by physical or logical transport between home and office, or from office to office(s) among designated recipients. The dramatic increase in the velocity of business transactions and the fusion of business, home, and travel environments has accelerated sharing of this proprietary commercial, government, and military digital information. To facilitate sharing and mobility, large amounts of valuable information may be stored on a variety of portable storage devices (e.g., memory cards, memory sticks, flash drives, optical and hard disc magnetic media) and moved among home and office PCs, portable laptops, PDAs and cell phones, and data and video players and recorders. The physical mobility of these storage devices makes them vulnerable to theft, capture, loss, and possible misuse. Indeed, the storage capacity of such portable storage devices is now approaching a terabyte, sufficient to capture an entire computer operating environment and associated data. This would permit copying a targeted computer on the storage media and replicating the entire data environment on an unauthorized "virgin" computer or host device.

Another trend in data mobility is to upload and download data on demand over a network, so that the most recent version of the data is always accessible and can be shared only with authorized users. This facilitates the use of "thin client" software and minimizes the cost of storing replicated versions of the data, facilitates the implementation of a common backup and long-term storage retention and/or purging plan, and may provide enhanced visibility and auditing as to who accessed the data and the time of access, as may be required for regulatory compliance. However, thin client software greatly increases the vulnerability of such data to hackers who are able to penetrate the firewalls and other mechanisms, unless the data is encrypted on the storage medium in such a way that only authorized users could make sense of it, even if an unauthorized user were able to access the encrypted files.

There is a balance among legal, economic, national security, and pragmatic motivations to develop robust security implementations and policies to protect the storage of proprietary digital information, based on the value of the information, the consequences of its exposure or theft, and the identification and trust associated with each of the targeted recipients. In order to provide such varying degrees of protection for portable storage devices, system methods and application functionality must be developed and easily integrated into the operating procedures of the relevant institutions. Different policies defining degrees of protection are required to economically accommodate and adapt to a wide range of targeted recipient audiences for this data.

Known encryption systems for these devices include the "Data Encryption Standard" ("DES"), which was initially standardized by the "American National Bureau of Standards", currently "National Institute of Standards and Technology" ("NBS" or "NIST") in the United States. Another includes the "Fast data encipherment algorithm FEAL" (FEAL) developed later in Japan, and described in the IECEJ Technical Report IT 86-33. U.S. Pat. No. 5,214,703 entitled "Device for the Conversion of a Digital Block and Use of Same" describes the use of additional devices as does an encryption device described in U.S. Pat. No. 5,675,653 entitled "Method and Apparatus for Digital Encryption". In most cases, the user making use of protecting the data after encryption or enciphering of a plaintext has delegated the strength of the invulnerability of the encryption to be positioned in front of an enemy attack. This positioning is aimed to discover the contents of the cipher text or the encryption key used, trusting in the organizations, institutions, or experts endorsing their security and providing a degree of confusion and diffusion of values introduced by the encryption device used in the cipher text. The user encrypting a particular plaintext has no objective security regarding the degree of confusion and diffusion of values present in a cipher text that result from the application of the encryption device. Attacks on personal computers and commercial, government and military data are now commonplace; indeed, identity theft of passwords is the largest white-collar crime in the United States. Yet passwords and PINs (Personal Identification Numbers), in most cases generated by human beings who are tempted to use native-language words, Social Security Numbers, telephone numbers, etc., are still the most used access security methods for protecting portable encryption devices, and among the most vulnerable to both brute force dictionary attacks as well as sophisticated logic tracing. Professional criminal attackers and even amateur hackers now have access to sophisticated software and supercomputing networks that can unknowingly invade processing devices and storage devices, trace software instruction sequences and memory locations, and by knowing or discovering the algorithms being used, intercept and copy encryption keys, PINs, and other profile data used to protect the access to stored content. They can exploit vulnerabilities in the underlying commercial software, or in the construction of the integrated circuit chips housing and executing the cryptographic processes, or in the specialized cryptographic software, which enables exposing keys and access parameters at some deterministic point in the processing sequence. Industrial laboratory facilities are also available to read the data content stored in memory cells by measuring the electronic charge through the use of electronic beam microscopes, and thus steal stored PINs, keys, and therefore access the previously protected data.

Many prior art methods exist for the key management protection necessary for securing key encryption keys for large groups of users. Split-key secret sharing schemes have been proposed whereby the decryption key is split and shared among multiple parties or entities to be combined to reconstitute the decryption key. In these cases, however, the individual secret shares themselves are maintained statically in multiple storage devices, generally on-line, where they are susceptible to attackers, particularly from within the institution, who can target the secret shares and recombine then to form the decryption key. Such solutions are often implemented for relatively static configurations of computing and storage devices and related communities of interest or tiers of users, and have not addressed the ability to so protect key encrypting keys when the data itself, and the means to encrypt and decrypt the data and to generate and recombine the shared secrets, are on a portable device.

Current file encryption systems provide a technique for a general-purpose computer to encrypt or decrypt computer-based files. Current encryption and decryption techniques typically rely on lengthy strings (e.g., 1024 bits, 2048 bits, 4096 bits, or more) to provide for secure encryption or decryption of files. Computer performance suffers due to the amount of data in the messages as well as the size of the encryption keys themselves.

Asymmetric file encryption systems use a different key to encrypt a file from the key used to decrypt the encrypted file. Many current file encryption systems rely on asymmetric encryption, such as those that rely on public key/private key pairs. An example of an encryption algorithm that utilizes public key/private key pairs is the RSA (Rivest, Shamir, and Adleman) algorithm. Symmetric file systems use an identical key to encrypt a file as the key used to decrypt the encrypted file. Certain file encryption systems utilize a cryptographic process or random number generator to derive a random symmetric key known as the file encryption key (FEK). The FEK is used to encrypt the file. Symmetric cryptography functions up to five orders of magnitude faster than asymmetric cryptography on files. Even with a very fast key device or software that encrypts/decrypts using the asymmetric key, any such file encryption system still has to overcome the fact that asymmetric keys generally operate at orders of magnitude slower than symmetric keys. When using the file encryption key, each time a file is being authenticated, the file encryption key has to be decrypted by the asymmetric key which is time consuming, but becoming less so as computer speeds and operations are constantly improving.

What is needed are highly robust and proven security techniques incorporated into new system methods and into new commercially available portable storage hardware apparatus to implement configurable security policies for accessing information through rigorous authentication means, to secure the information with certified levels of accepted cryptographic technology, and to rigorously control the environment within which the information is shared.

In addition, there is a need to better secure portable storage apparatus and method of encrypting and sealing digital information files and storing them in the device's integral or removable memory, or alternatively on the host device's memory or other ancillary memory storage devices, while operating under cryptographically protected security policies for transport and authorized access to such digital information.

There is also a need for secure physical and logical transport of data to and from multiple recipients. To this end, it is desirable to provide a means of securely transporting data from one place to another, if the user has to carry the data or physically transport the data and the secure encryption device, and somehow communicate the information necessary to log on and access the data by another authorized user. What is required are a multiplicity of methods to securely transport the encrypted data, either physically or logically, between an Originator user and one or more Receivers.

The use of encryption devices by the general population is becoming very common in for example, commercial electronic transactions and/or electronic mail. A predominant portion of all societies want to believe in an objective, easily verified way, that the maximum degree of the diffusion and confusion (encryption) of data and data values provided by a system they are using to encrypt their data, is the superior set of encrypted devices and system.

SUMMARY

As stated above, the present disclosure also describes one or more securitized container management devices, comprising at least one control plane, at least one trust plane, and at least one container, wherein at least a single path of signals, controlled by a controller, that exist and are transferred within a control plane to the trust plane or the container or both to the trust plane and to the container, wherein the signals further travel through the control plane to the trust plane or the containers or both to the trust plane and to the container, and wherein the signals are securitized or encrypted or both securitized and encrypted either before, or as the signals enter the at least one container wherein said container management devices are combined with one or more devices comprising a real or virtual master distributed auto-synchronous array (DASA) database located within or external to one or more devices that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from multiple partial user devices, to and from multiple partial access devices or to and from both partial user and partial access devices, wherein one or more partial user and partial access devices store and provide at least partial copies of portions of the master DASA database and wherein the master DASA database, the partial DASA databases or both partial and master DASA databases are linked and communicate with each other as well as one or more logging and monitoring databases capable of statistical and numerical calculations utilizing the data, wherein the tools authenticate using a first set of computing operations, validates using a second set of computing operations, and wherein a third set of computing operations controls access for a specified set of users, wherein the computing operations define rules utilized to provide logic with regard to communications between master and partial DASA databases and partial user and partial access devices.

In most embodiments, the at least one container is connected to the control plane such that the signals enter the container subsequent to entry to the control plane, wherein the control plane accesses one or more containers and wherein a set of instructions is added to the containers via one or more application logic repositories and from one or more container prototype repositories, and;

wherein at least one container is connected to the trust plane such that the signals enter the container subsequent to entering the trust plane.

The signals are often sent directly from a control plane to at least one container and wherein signals from the control plane are control plane signals. The signals may also be sent directly from the trust plane to at least one container and wherein signals from the trust plane are trust plane signals.

In other embodiments, the securitized management container devices further comprise a real or virtual master distributed auto-synchronous array (DASA) database or both one or more real and virtual master distributed auto-synchronous array (DASA) databases located within or external to one or more securitized container devices that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from multiple partial user devices, to and from multiple partial access devices or to and from both partial user and partial access devices, wherein one or more partial user and access devices store and provide at least partial copies of portions of the master DASA database and wherein the master DASA database, the partial DASA databases or both partial and master DASA databases are linked and communicate with each other as well as one or more logging and monitoring databases capable of statistical and numerical calculations utilizing the data, wherein the tools authenticate using a first set of computing operations, validates using a second set of computing operations, and wherein a third set of computing operations controls access for a specified set of users.

Here, the master and partial DASA databases analyze and provide information in a form of data and act to control one or more output devices, wherein the output devices create user devices.

The control plane signals can flow through the trust plane or other mechanism that provides trust prior to entrance into said containers and wherein the control plane can include its own mechanism of trust.

In many embodiments, the signals are communications signals, wherein the communications signals either contain or themselves are data transmissions. The signals are securitized while containers are created, and wherein securitized signals are a mechanism of trust. In addition, the signals are securitized for containers that already exist.

In several embodiments, the signals are encrypted for containers that either are created or already exist and wherein encrypted signals are a mechanism of trust. The signals are securitized and encrypted for containers that either are created or already exist and wherein securitized and encrypted signals are a mechanism of trust.

In other embodiments, signals travel through one or more tunnels from the control plane to the trust plane and wherein the signals travel through one or more tunnels from either the control plane or the trust plane or both control and trust planes into and out of the containers.

In many embodiments, the tunnels themselves are securitized and carry securitized transmissions. The tunnels themselves are encrypted and carry encrypted transmissions. Here, often the tunnels are both securitized and encrypted and carry both securitized and encrypted transmissions.

For the tunnels, transmissions are selected from one or more of a group consisting of data, voice, and optical transmissions and wherein said signals are selected from one or more of a group consisting of electrical, optical, mechanical, electromagnetic, and radiative energy from an energy source that is capable of providing such signals.

The tunnels are channels through which signals travel. The trust plane provides both inter-container and external container connections for signals traveling into and out of the trust plane.

In addition, the control plane provides both inter-container and external container connections for signals traveling into and out of the control plane.

For the container devices, the signals into, out of, or within the control plane provide an ability to create, initiate, modify, destroy and remove the containers, such that the containers are temporary and become obsolete subsequent to deployment.

Signals from the control plane are selected from one or more of a group selected from authenticated, verified and encrypted signals, by the controller, wherein the controller exists either within or external to the control plane. The signals from the trust plane can be selected from one or more of a group selected from authenticated, verified and encrypted signals by a controller that exists either within or external to the trust plane.

The container devices exist with containers that are embedded with secure communications. Here, the container devices operate in a frictionless manner in that scripted control and operation occurs without interruption and wherein originated signals remain intact during operation. The signals often carry preprogrammed source code that enables and manages operation of the containers. These devices can be real or virtual devices.

In several embodiments, these container devices include a statistics communication processor wherein the statistics exist for setup and operational parameters, system resource use, communications connections, volume of data, run time and external communications monitoring.

The statistics processor may also provide for statistical correlation and autocorrelation that create warnings and alarms for containers that do not maintain statistical norms in comparison with containers that are within statistical norms.

In further embodiments, a system for using one or more securitized container management devices is described, wherein the devices are comprising at least one control plane, at least one trust plane, and at least one container, wherein at least a single path is transferring signals controlled by a controller that is existing within a control plane to the trust plane or the container, or both the trust plane and the container, and wherein the signals continue traveling through the control plane to the trust plane or the container or both the trust plane and the container, and wherein the signals are securitized or encrypted or both securitized and encrypted either before, or as the signals are entering at least one container wherein the system for using the container management devices are combined with one or more devices comprising a real or virtual master distributed auto-synchronous array (DASA) database located within or external to one or more devices that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from multiple partial user devices, to and from multiple partial access devices or to and from both partial user and partial access devices, wherein the one or more partial user and partial access devices store and provide at least partial copies of portions of the master DASA database and wherein the master DASA database, the partial DASA databases or both partial and master DASA databases are linked and communicate with each other as well as one or more logging and monitoring databases capable of statistical and numerical calculations utilizing the data, wherein the tools authenticate using a first set of computing operations, validates using a second set of computing operations, and wherein a third set of computing operations controls access for a specified set of users, wherein the computing operations define rules utilized to provide logic with regard to communications between master and partial DASA databases and partial user and partial access devices.

In additional embodiments, a system for providing one or more managed securitized container devices and systems comprises initializing a container image that is validated and downloaded onto or into at least once container, wherein a validated program is loaded onto the container that requires reserve computer resources including one or more input/output interface(s), a memory, and network capabilities such that encryption of container-related data at rest or data in transit is implemented by utilizing dynamically changing keys created for each input/output tunnel and/or for each container utilizing the tunnel that are providing transmissions path(s) for loading containers with software applications protected by the encryption wherein the securitized container management devices are combined with one or more devices comprising a real or virtual master distributed auto-synchronous array (DASA) database located within or external to the one or more devices that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from multiple partial user devices, to and from multiple partial access devices or to and from both partial user and partial access devices, wherein the one or more partial user and partial access devices store and provide at least partial copies of portions of the master DASA database and wherein the master DASA database, the partial DASA databases or both partial and master DASA databases are linked and communicate with each other as well as one or more logging and monitoring databases capable of statistical and numerical calculations utilizing the data, wherein the tools authenticate using a first set of computing operations, validates using a second set of computing operations, and wherein a third set of computing operations controls access for a specified set of users, wherein said computing operations define rules utilized to provide logic with regard to communications between master and partial DASA databases and partial user and partial access devices.

For these systems, the keys are loaded into or onto container security portions of the container thereby leading to establishment of initial communications tunnels and allowing for validation that security has been implemented.

The use of a container often occurs after securitization and encryption is complete so that a container's function in developing a software application is completed in a secure manner. As the container devices are created and subsequently discarded, and wherein statistics involving all securitization and encryption data at rest and data in transit is monitored, this leads to full comprehension regarding notification when a managed securitized container device and system is used.

The system further operates by transmission of a credential identifier to an access control server when the devices are determined to be operating, a local authentication processor configured to authenticate the credential identifier against entries of one or more keys existing within tables when the access control system is determined to be operating and a input/output processor configured to send a signal to a secured area when the credential identifier has been successfully authenticated; wherein the communication transceiver includes an interface to serve second data that can be displayed to both a user external to the access control devices and displayed on the access control devices themselves.

In one or more embodiments, the data is transmitted to a secured area such that the data is transmitted and received by a cellular phone.

In many embodiments, if access is allowed, a user's device provides use of oral, visual, or text data on a display, as a message that indicates a match so that the user is allowed access. If access is denied, the user's device provides use of an oral, visual, or text data on a display as a message of denial of the match indicating that said user is denied access. Denial of the match causes an encryption application on the user's device to be removed and to ensure that master keys in a user table are secured, a new master key in the user table is generated either via a signal from the user's device to one or more secured encryption databases or via a signal from a key management system to the one or more secured encryption databases.

The key management system is a system that provides one or more keys for encryption or decryption or both encryption and decryption as required by the devices. The devices control access to an enclosed area from a group consisting of a building, a room within a building, a cabinet, a parking lot, a fenced-in region, and an elevator.

In yet additional embodiments, further comprising a signal converter coupled to a communications processor that is capable of receiving and transmitting data as signals exist and the communications processor is agnostic to a communication protocol of an access control server that is also a portion of the devices. The signal converter can be agnostic to a communication protocol of a local authentication processor. In addition, the signal converter can be adapted to interface with a plurality of access controllers.

The communication transceiver is provided for partial user devices or partial access devices or both and includes at least one of the group consisting of; a serial interface, a TCP/IP interface, an IEEE 802.11 interface, an IEEE 802.15.4 interface, and a secure HTTP interface. The communication transceiver is configured to transmit a credential identifier to access a control server via a wireless communication link. The communication transceiver receives one or more credential identifiers from a radio-frequency identification (RFID) transponder included in an access control card.

In most embodiments, the operational modes of the devices include at least one of a synchronous mode and an asynchronous mode. The data may be transmitted to an access control server that is encrypted. In many cases, the credential identifier can be transmitted to an access control server via a wireless communication link.

BRIEF DESCRIPTION OF THE DRAWINGS

Embodiments of the present invention are presented in the following drawings.

DETAILED DESCRIPTION

Figure 1:
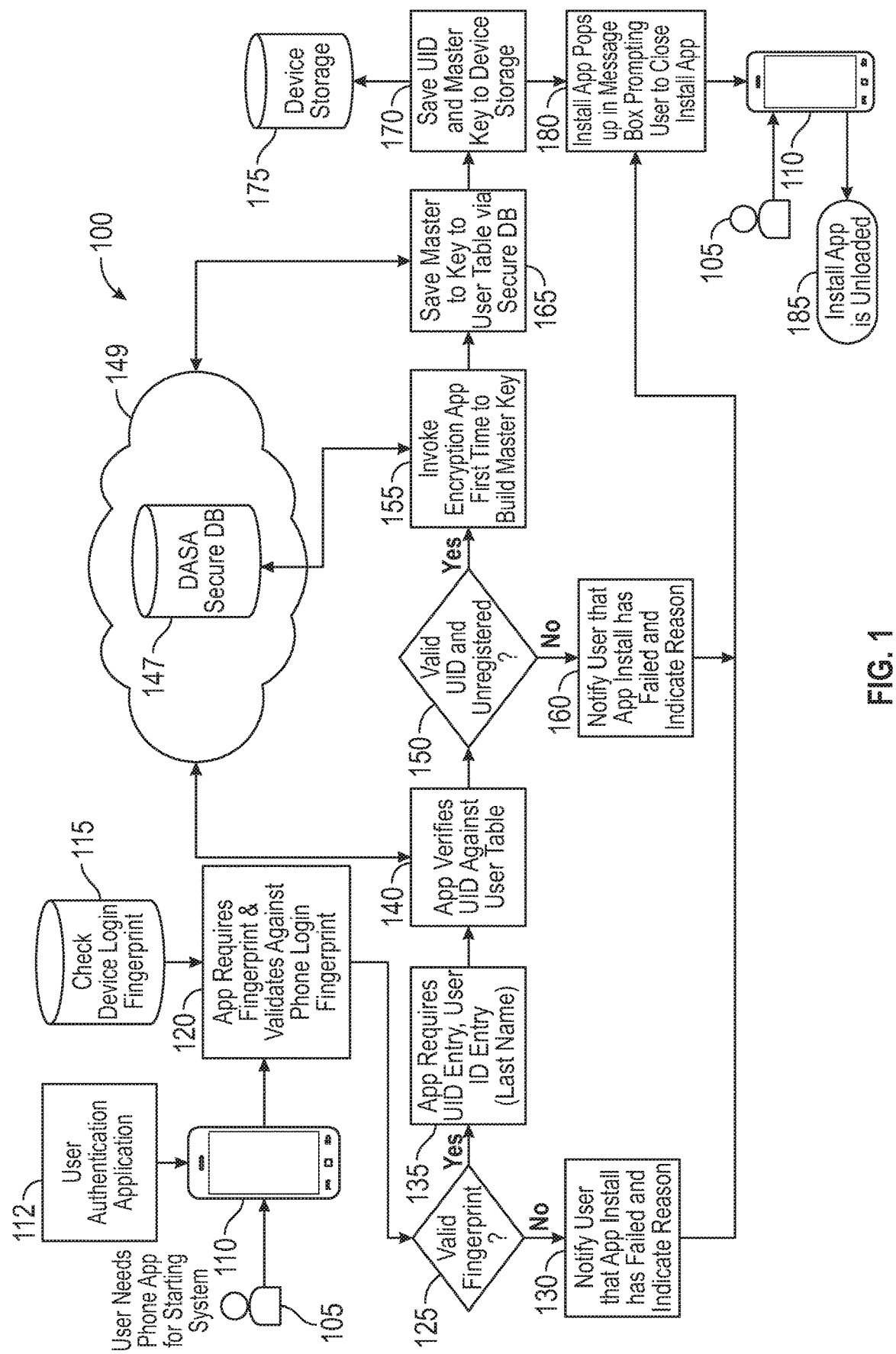
FIG. 1 is a flow chart describing the installation of a user authentication application for a user onto a cellular/smart phone in accordance with the present invention

While the foregoing discussion has dealt primarily with detecting unauthorized communicating devices, the present invention may also include the ability to detect unauthorized users. In many applications, including credit card authorization and approval and cellular telephone communications, it is frequently desirable to verify that the communication is being initiated by an authorized user. The inclusion of a user authorization system is beneficial for reducing the use of authentic communicating devices when they have been stolen or lost. Losses due to the use of lost or stolen communicating devices is also very significant, but is inherently limited to the capacity of the authorized communicating device itself, i.e., one communication at a time, a credit limit, etc. Furthermore, the use of lost or stolen communicating devices by unauthorized users may be restricted by the use of user specific codes, such as a personal identification number (PIN), finger print, password, voice commands and the like.

In another aspect of the invention, the host device and/or the communicating device may be programmed to verify the identity and authenticity of the device alone or in combination with the user. In one example, the host computer may first verify that the communication is being initiated from an authorized communicating device, then prompt the user to enter a personal identification code (PIN) indicating that the user is also authorized. Only upon satisfaction of these two criteria is the communication be allowed to proceed. It should be recognized that the host device could be programmed to verify these two codes, or other additional codes and authorizations, in any order. In another example, the communicating device itself may require the successful input of a personal identification code prior to enabling or energizing the transaction specific code, any portion of the device identification code or even some portion of the communication itself.

A still further aspect of the invention provides for automatic re-synchronization of the transaction specific codes following one or more unauthorized communications. Re-synchronization methods according to the present disclosure may be achieved by programming the host device to reset the a pointer or designated portion within a database regarding transaction specific (TS) codes for a particular identification code upon receiving a series of attempted communications having a series of transaction specific (TS) codes that match a portion of the database. For example, after receiving an attempted communication having a transaction specific (TS) code that is not the next expected transaction specific (TS) code or within the range of tolerance, no further communications using the same identification code can proceed until the transaction specific codes of the communicating device and the host are re-synchronized. If the host device is programmed to allow re-synchronization after receiving three transaction specific codes (i.e., 12, 13, 14) that match a portion of the host database (i.e., 10, 11, 12, 13, 14, 15, 16, etc.) for the given identification code, then the pointer in the host database is reset for the next TS code (i.e., 15) in the database. Subsequent communications may proceed in accordance with the aforementioned methods. It may be beneficial to a separate range of tolerance for re-synchronization in order to prevent re-synchronization at a dramatically different point in the sequence of transaction specific codes.

FIG. 1 is a flow chart (100) describing the installation of a user authentication application (112) for a user onto a cellular/smart phone in accordance with the present invention. More specifically, the system provides for a user (105) to operate a secured cellular ("smart") phone (110). The user (105) must download an application (app) (120) from a device that provides a check on a fingerprint (or other bio-identifier) (115). These devices require fingerprints (or other/additional individual biomarkers) which must be subsequently validated (125). When the fingerprint is not valid, the user (105) is notified (130) and is prompted to close the install application (180) which is unloaded (185). In the case where the fingerprint is validated, the user (105) must then provide a user ID (UID) entry (135). This UID entry must be verified against a user table (140) which resides within one or more secured distributed auto-synchronous array databases (DASA), (147) to determine if this user is a valid registered UID (150). The DASA database can exist in one or more stand-alone storage devices, computers, computer related clouds, the world-wide-web (internet), intranet, and/or servers (149). In the case when the user (105) fails to validate, the user is notified (160) and the application is unloaded (180, 185).

When the user (105) is validated, an encryption application within the DASA database (147) is employed to "build" a master key (155). Next, the master key is sent to a user table (165) via the secured DASA database (147). The combination of the user ID and the master key (170) are then stored within a storage system (175) (such as a memory chip within the cellular phone or transmitted subsequently or directly into a cloud based memory system external to the cellular phone). Finally, an installation application (app) message is received and displayed (180) by the cellular phone (110), prompting the user (105) to finalize the installation application onto the cellular phone (110) for the user (105). The user app is subsequently be unloaded (185).

Figure 2:
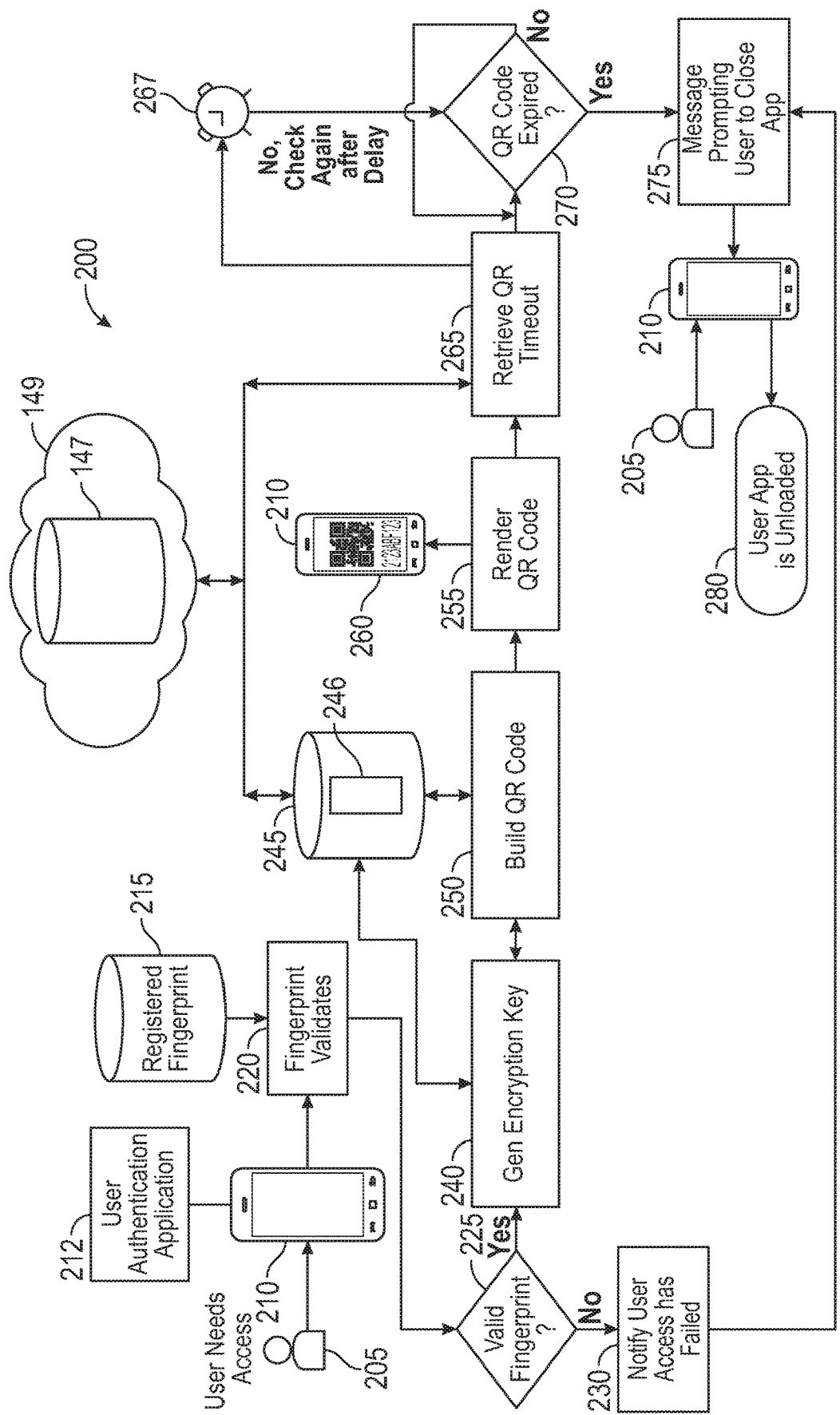
FIG. 2 is a flowchart describing the use of an authentication application that creates a user credential such as a QR code onto a cellular/smart phone.

FIG. 2 is a flow chart (200) describing the use of an authentication application that creates a user credential such as a QR code onto a cellular/smart phone in accordance with the present invention. More specifically the system is for a user (205) that needs access through a secured door (or entrance) and in this instance invokes the use of the user authentication application (212), (which corresponds to (112) in FIG. 1) onto an encrypted cellular phone (210). The user (205) activates the user authentication application (212) from the cellular phone (210) which provides a check on a fingerprint (or any other bio-identifier) (215) that requires fingerprints (or other/additional individual biomarkers) which must be subsequently validated (220). If determination of validity (225) fails (230), the user (205) is notified (230) with a message (275) prompting the user (205) to close the application (212) and the application is subsequently unloaded (280).

The storage device (245) contains records with at least one user record (246) residing within the DASA database (147). When determination of fingerprint validation (225) is confirmed, then an encryption key (240) is generated, utilizing information in the user record (246), of the DASA database (147), residing in storage device (245). In this instance, a QR code is built (250) utilizing the encryption key (240) and information in the user record (246). The QR code(s) function as a "superset" of synchronous transaction specific codes (TS codes) within the DASA database (147) user record(s) (246). More specifically, the QR codes contain all the functionality of the TS codes plus additional specific metadata pertaining to items such as; user temporal information, location, and historical usage. The QR codes utilized in this specific instance, can themselves be encrypted with one or more levels of encryption.

Next, the QR code is rendered for display (255) onto the cellular phone (210) via a "user friendly" text derivation that changes the cellular phone into a "smarter" phone (260) in that it now has a QR identifier residing on the phone (210). The QR code timeout threshold (265) is retrieved from a configuration table also held within the records (246) of the DASA database (247). Next, a clock (267) is preset with this timeout (265). The clock (267) is to check to determine if the delay between the start time and end time is properly achieved regarding whether or not the generation of a new QR code has expired (270). If the QR code has not expired it can be used to match that of the receiving portion of the security system described below. If the QR code has expired, then the user application (app) (212) a message is displayed (275) on the cellular phone (210), prompting the user to close the app which is subsequently loaded (280).

Figure 3:
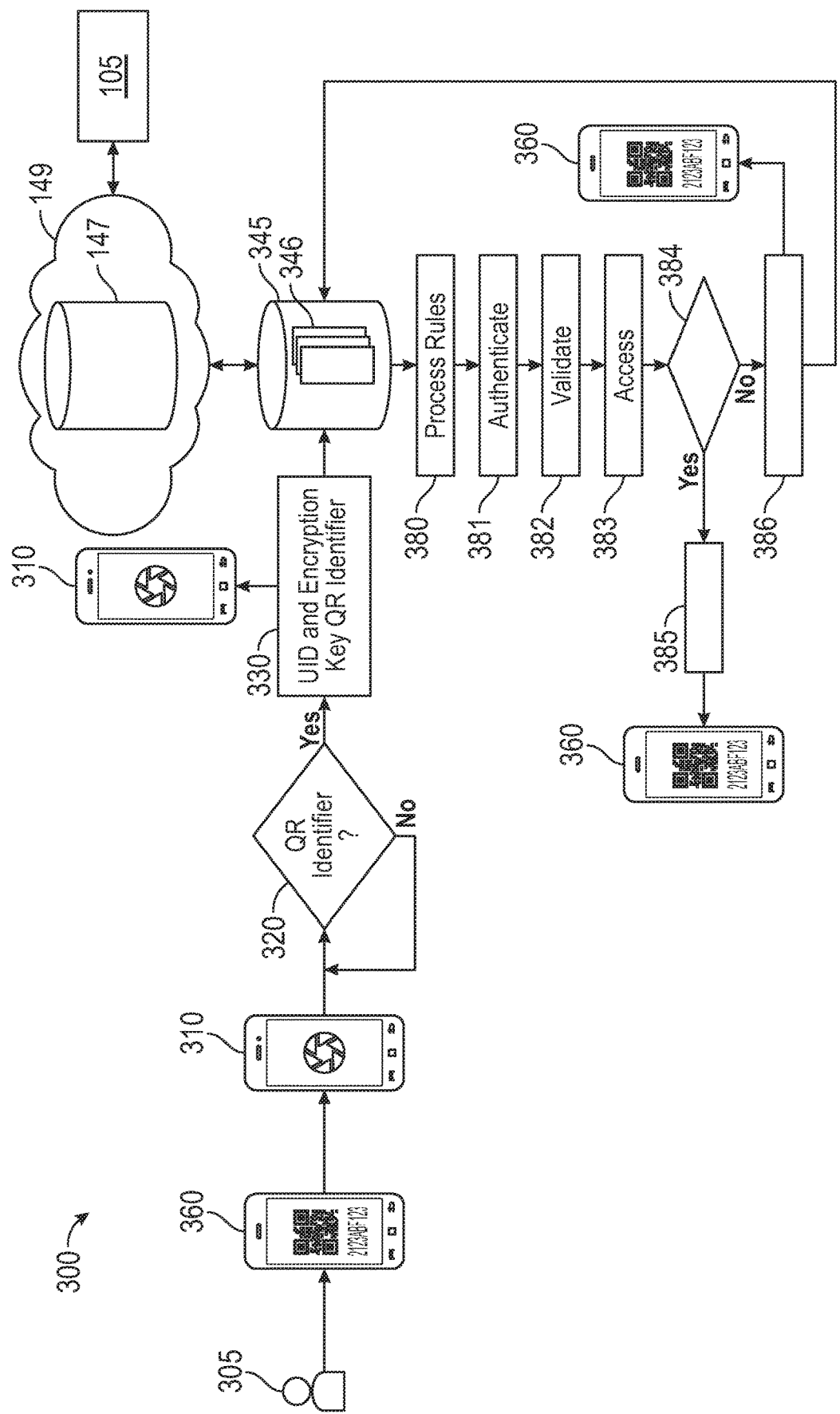
FIG. 3 is a flow chart describing the access process for a user with an authenticated credential.

FIG. 3 is a flow chart (300) describing the access process for a user (305) with an authenticated credential. The authenticated credential in this instance are one more QR codes. The system utilizes two separate devices. The user device which is a smarter cell phone (360) and displays a QR code and corresponds to (260) in FIG. 2. The other device is an access device that has been installed in a cellular phone (310) but can also be a card reader for entrance into a secured location.

More specifically, the user (305) that needs access through a secured door (or entrance) in this instance invokes the use of the smarter cell phone displaying a QR identifier (360). This smarter phone (360) is then pointed toward access device (310). In this specific instance, the access device is a cellular phone (310) that includes a camera or other detecting technique that is operating by searching for a QR identifier. If the QR identifier is found (320) then the next step is to acquire a User Identification (UID) and encryption key embedded in the QR identifier (330). Simultaneously (or within a short time interval), the access device (310) sends an oral verbal/text/data message displayed or specifically stated as "attempting access".

The DASA database (147) contains secured access information that resides in the records (346) of the storage device (345) and employs a set of process rules (380) that are followed to authenticate (381), validate (382) and determine access (383) for the access device (310). There can be, and often are, different rules that should be followed for other access devices. The flow path provided indicates that the access device(s) authenticates (381) using a first set of rules, validates (382) using a second set of rules, and includes a third set of rules that controls access (383) using data that has been supplied by the user device (in this case the smarter cell phone (360)) that ensures access to only the authenticated and validated set of users under specified conditions.

The process rules are finalized with an access decision (384) which includes at least two options. One option is an access decision that includes the process of allowing user access (385) with the smarter cell phone (360) and verifies the user (305) has invoked its privileges. In this instance this includes physical access such as opening doors or otherwise gaining entrance to secured areas. This equally applies to gaining logical access such as unlocking data within databases or communication systems. The user (305) is alerted when the system allows access by displaying a message on the access device (360). The user's activity is monitored by the access process (385) to ensure that they have utilized their access within certain limitations. Physical limitations may be provided by enabling door monitoring switches, floor-mats, man traps, video analysis, etc. Logical limitations may be monitored by keyboard and/or data access and the like. Temporal limitations may be employed as required. Access may further be limited by counting the number of access egress or access egress attempts. In the case of access denial (386), the user will be normally be notified of the denial of access by a displayed message on access device (360) and optional alarming may take place. Reporting of the activity is normally returned from the access device (360) to the storage device (345) containing records (346) which are synchronized to the DASA database (147), which also provides for logging the data, meta-data, and associated information to the external logging and monitoring database (105).

In a further aspect of the invention protecting the security of cellular/smart phone, the security of any transmitting/receiving (transceiving) of signals of the cellular/smart phone with other devices, as well as protection of the acquisition of the QR codes are all accomplished by the use of the encryption techniques described above.

In another aspect of the invention, this electronically generated bit or any number of electronically generated bits may be provided to indicate other information about the use of the card, such as an excessive number of attempts to enter the personal identification code. Other uses for additional electronically generated bits will become apparent in particular applications.

While most of the foregoing discussion about the present encryption technique has focused on the use of databases, lists and tables for storing transaction specific codes, it may be preferred in some applications having limited memory to provide an algorithm for calculating the next transaction specific code. In these applications, the pointer refers to the number of steps into the algorithm or the value input into the algorithm and the transaction specific code is the calculated output of the algorithm. The cellular/smart phone and QR code generator are provided with the same algorithm and compares the transaction specific code received from the communicating device with the next expected transaction specific code. The concept of "tolerance" described earlier may be incorporated either by setting an acceptable range of values for the transaction specific code (output of the algorithm) or the pointer itself (input to the algorithm), the latter being the equivalent of back calculating the pointer and verifying that it is within the range of tolerance.

As described in detail above, container software developers are utilizing hybrids that may or may not provide the security they think they are applying to newly developed software using securitized containers.

In contrast, the present disclosure utilizes a level 4 securitization technique for TLS (transport layer security). Level 4 refers to layers that are in a communications stack which from bottom to top is as follows:

Communication Layer (1): Wires and connectors

Communication Layer (2): Software running over Layer 1—such as token ring or ethernet Communication Layer (3): Wireless area networks—if wireless connecting from one computer or other hardware device to another IP address—such as the internet—IP address to IP address communications.

Communication Layer (4): As communications go through the stack from top to bottom, where the manner of transport is irrelevant this last layer becomes the security layer, which presently is where IP SEC resides and is executed.

This "Layer 4" is known as the transport layer security level or TLS—where security is occurring at the transport layer. Here is where the communications "traffic" is routing from or to communications ports. Typically layer 4 is attached to the application itself and provides logical connections between applications. This, understandably is why TLS security is critical. The present disclosure describes devices and systems that places the TLS security into the structure of the container itself. In this manner, a developer can provide any application immediate security within the container using the "ICEMicro security devices and systems". The system allows the developer to inform the container(s) what connections are allowed between transport layer(s) and where the "ICEMicro" securitization and/or encryption should be placed. This technique creates and provides a "tunnel" that now exists from one container to a different container and utilizes its own dynamic key and with its own tunnel. The ICE system may provide multiple tunnels as there are 16 bits of tunnels which equates to 65,535 ports, all of which can possess their own keys. The keys are dynamically changed by the "ICE" Library. In addition, each tunnel can go to any other location (including other containers), all capable of running individual independent sets of security on their data transmissions. Developers will gain significant speed and efficiency using the "ICE" system, as securing communications between two containers is accomplished as quickly as applications can be created. ICEMicro does not require additional development overhead or network security expertise.

The devices and system of the present disclosure utilize running dynamic ephemeral (temporary) keys as another layer of protection provided by the encryption tools (also described herewithin). The present disclosure describes an "ICEMicro" version of a TLS protocol, which can be run on/or embedded in containers (or hybrid systems). In addition, the present disclosure supports container compatible Hypervisors. Hypervisors are layers of software located between the actual computer systems and the operating systems—which enables virtual operating systems to operate on the same computing platforms developers utilize during software development.

In addition, the ICE Micro devices and system of the present disclosure provides security bridges so containers with built-in security DASA encryption can directly communicate. These are security bridges for communications between containers. The system also provides for communications from one container to a legacy network/device or from a legacy network/device to another legacy or any other network or communicating device, whether networked or not. Dynamic Encryption Technology eliminates vulnerabilities caused by exposure of any single encryption key by continuously changing encryption keys and keeping the keys synchronized in a fault-tolerant manner.

Perpetual Authentication Technology uses multiple virtual channels or tunnels for encryption so that in the event one channel or tunnel is compromised, the other tunnels maintain encryption integrity. Together, these technologies not only eliminate the single point of failure problem created by having keys exposed through brute force, side channel, or other types of attack, but do so with very low latency and performance overhead. Whether at rest or in-motion, the encryption processes described ensures communications data (and all associated signals) remains safe, secure and uncompromised.

So that the above recited features and advantages of the present disclosure can be understood in detail, a more particular description of the invention and reference to embodiments are provided and illustrated in the following figures. It is to be noted, however, that the following drawings illustrate only typical embodiments of the present disclosure and are therefore not to be considered limiting the scope or other equally effective embodiments.

Figure 4:
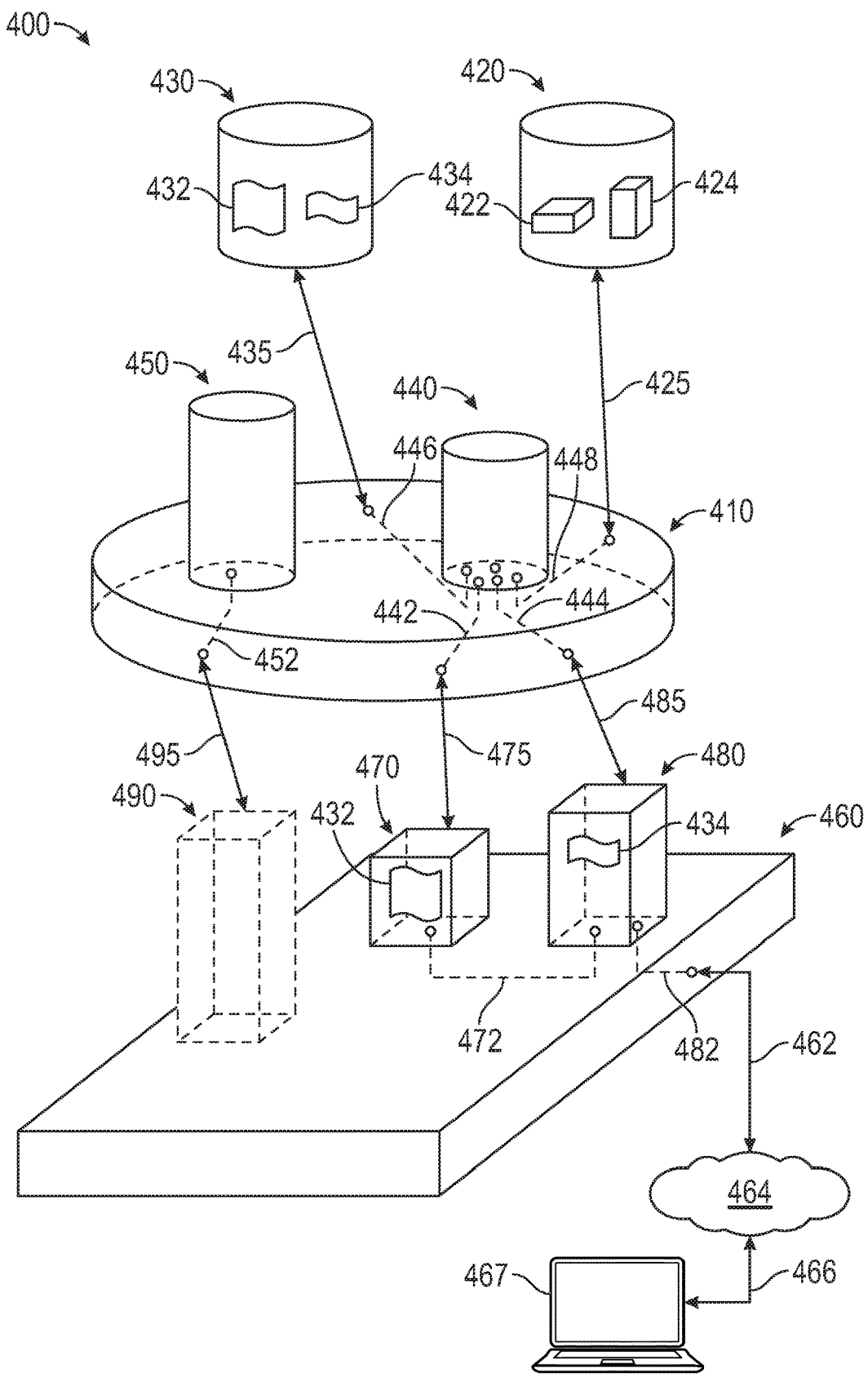
FIG. 4 is a three-dimensional schematic diagram illustrating and representing an exemplary device and associated system that provides the "ICEMicro" securitization and encryption device and associated system for securitized containers.

For FIG. 4, the managed securitized container device and system (400) is shown as a three-dimensional schematic which initially includes a control plane (410), a container repository (420) and an application repository (430) with two (normally software) container prototypes (422,424) within the repository (420), and with two different types of applications logic (432,434), and a connector (425) which connects the containers (422, 424) to the control plane (410) as well as a connector which connects the application repository (430) to the control plane (410). Heading down the schematic from the top toward the bottom portions, there exists a control plane logic canister initiator and monitor (440), which is similar to but not necessarily identical to the control plane logic remover and destroyer canister (450). Here it is important to note that once these canisters and eventually the containers, that may be created within or by the canisters, once used, will be discarded or destroyed. In other words, the usefulness of the containers, (440,450) once they have delivered (as initiators followed by destructors) their content, diminishes and often has no further use. To alleviate or eliminate potential data memory and processing issues that occur for the overall system, discarding the containers is a normal course of activity for software developers. The containers may have had their contents emptied or they may be reused if not emptied. Moving further toward the bottom of the system (400), signals (normally communications signals) travel (442) from the control plane logic canister initiator and monitor toward the trust plane (460) via a connector path (175) from the control plane (410) to a shorter container (470) with application logic (432) which is either embedded in or sits atop the trust plane (460). The trust plane (460) provides both securitization and encryption as required by the system (400).

Likewise, signals travel (444) from the control plane logic canister initiator and monitor (440) via a connector (485) which also provides a signal path (or tunnel) toward the trust plane (460) via a connector (485) from the control plane (410) to a longer (higher) container with application logic (480) which is either embedded in or sits atop the trust plane (460). In some cases, the signals may travel from connector (446) connecting the application repository (430) directly to the control plane (410) bypassing the canisters (440,450) and eventually via a pathway (442) toward the connector path (475) which enters either the container (470) or a portion of the trust plane (460). As before, the trust plane (460) provides both securitization and encryption as required by the system (400).

In addition, there is a signal path (446) that connects the control plane logic canister initiator and monitor (440) via pathway (435) and an application repository (430) with two (normally software) application logic prototypes (432,434) to ensure securitized communication(s) along this and all signal paths. Likewise, a signal path (448) connects control plane logic canister initiator and monitor (440) to a connector (425) which connects the containers (422, 424) to the control plane (410) as well as a connector which connects the container repository (420) to the control plane (410) for complete logic control that includes creating canisters and containers or bypassing canisters and directly creating containers.

To complete the signal path from the control plane (410) toward the trust plane (460), a shorter container (470) with application logic (432) is created and exists on or is embedded in the trust plane (460). The signal path (472) provides for flow and connection between the shorter container (470) and the longer (higher) container (480) which contains application logic (434). A connector path (485) also exists and allows for signals to pass from the control plane (410) and plane logic initiator and monitor (440) via an initial signal pathway (444).

There is also a connector path (475) from the control plane to the shorter container (470) and essentially identical signal paths (485, 495) which connect with both the longer (larger, higher) container (480) and the virtual container (490). The signal path (482) either leads signals toward or receives signals from an unsecured environment via a connection (462) and/or connection path that connects the trust plane (460) and/or containers (470, 480, 490) with either a cloud environment (464), where unsecured data may reside and eventually via a connector path (466) to a computer (467).

Also existing on or in the control plane (410) is a control plane logic canister remover and destroyer (450). Here a signal path (452) is used to connect the canister remover and destroyer (450) to a virtual container (490) via a signal path (495) that is also located at (in or on) the trust plane (460). This represents a communication path for the "end of life" for the virtual container (490) which initially existed as a real container. This entire portion of the schematic representation (450, 452, 490, and 495) will disappear at the end of life once the container has been utilized. This also is provided to represent the ephemeral nature and connections associated with software containers as used by software developers today.

Figure 5:
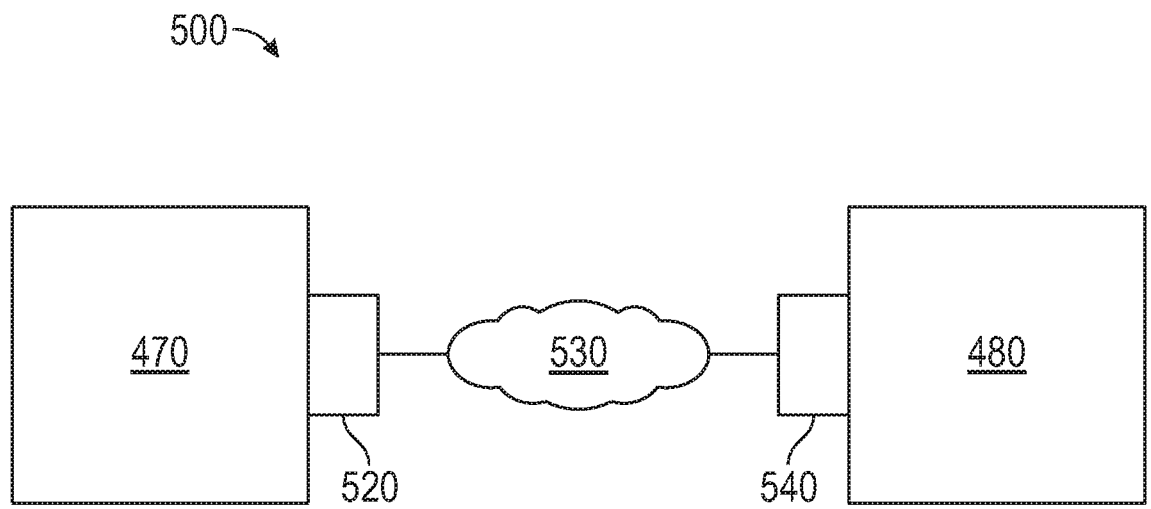
FIG. 5 is a schematic diagram illustrating and representing securitization and encryption of communications using "ICEMicro" between two securitized containers.

FIG. 5 is a schematic representation of the physical implementation regarding how two (or more) containers can communicate in a secure and optionally encrypted manner (500) residing on a trust plane (460). The first container which was represented as the shorter of the two containers (470) in FIG. 4, resides on a trust plane (460—shown in FIG. 4 only) as also shown in FIG. 4 that both sends and receives signals through a transceiver (420). Likewise, the second container, represented as the taller of the two containers (480) both sends and receives signals through another transceiver (440). Both transceivers are either actually or virtually connected to each of the containers. A cloud computing environment (530) may exist between the two containers (470, 480) which will be able to access the cloud (530) as needed via signal transmission (data transmission) via the two transceivers (520, 540).

Figure 6:
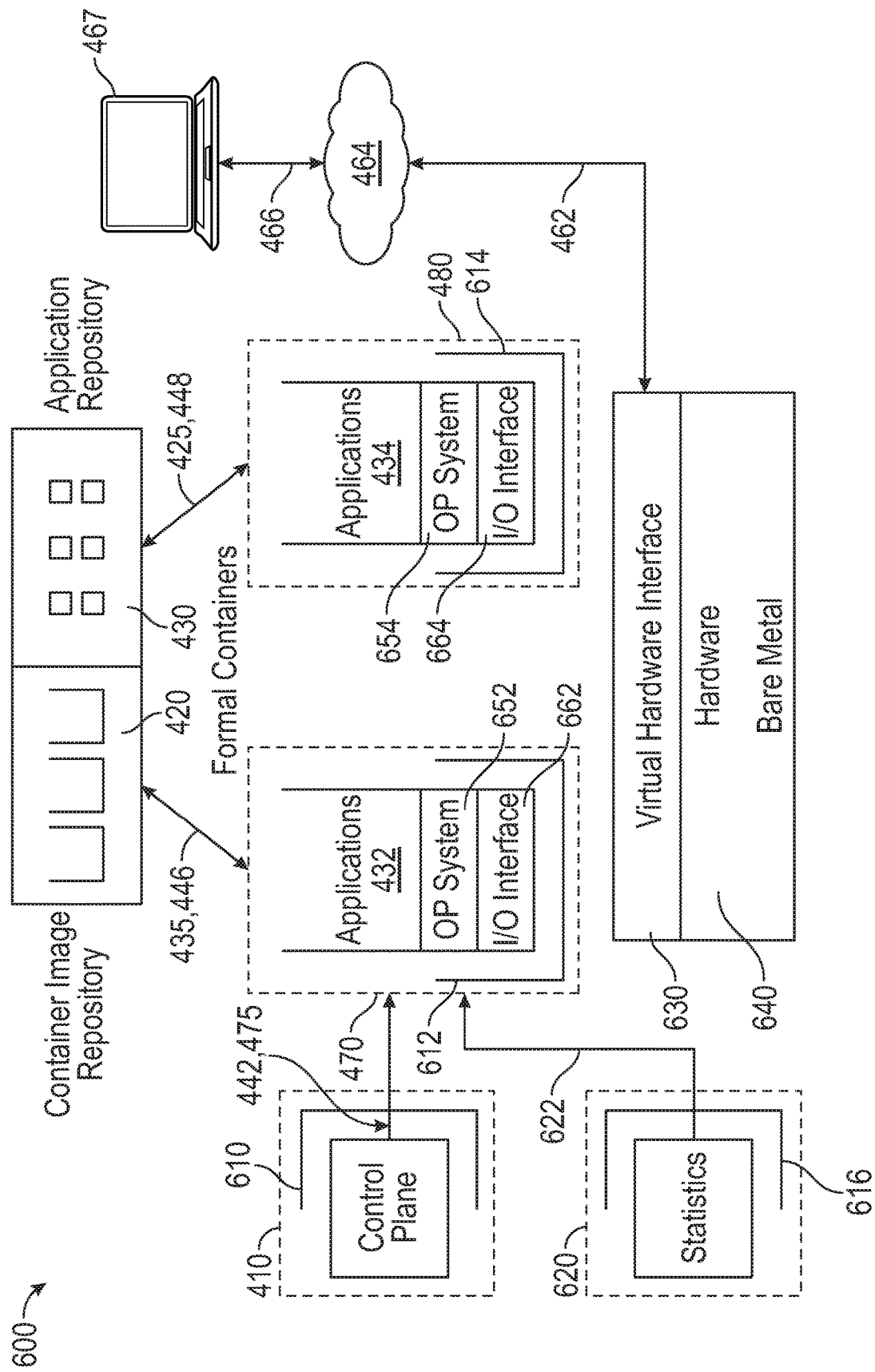
FIG. 6 is a two-dimensional detailed schematic overview and flow path associated with the exemplary device and associated "ICEMicro" system shown in FIG. 1.

FIG. 6 is a more detailed two-dimensional version (600) of the managed securitized container device and system (400) schematic shown in FIG. 4 representing most possible signal flow paths for the system. As for FIG. 4, there exists an applications repository (430) and a container repository (420). As in FIG. 4, the full container (470) is shown with a dashed line representing the fabric that comprises the container with the application logic (432) as described above. In addition, dashed and solid lines exist to represent the entire "fabric" of the ICEMicro securitization employment as shown with (410, 412, 414) for the control plane (410) and the two containers (470, 480).

Together with the application logic (432) there is also shown and deployed an operating system (652) and an I/O interface (662) to ensure communications with a second container (480) having its own application logic (434), operating system (654), I/O interface (364) so that they can communicate with each other and the cloud (464) and computer (467). There is also included a virtual hardware interface (630) sitting on the actual hardware (bare metal), 640. The system is controlled by a controller residing in or on the control plane (410). In addition, there is a statistics communication processor that allows a software developer the ability to monitor and analyze the system continuously through both the control plane fabric (610) and the statistics communication processor plane and fabric (620). The statistics communication processor (616) is connected to the statistics plane via (622) which is the connector from (620) to the trust plane (460) as shown in FIG. 1. All connector lines for FIG. 6 are the same as those described in FIG. 4. Here, however, in FIG. 6, it is necessary to employ the virtual hardware interface (630) and accompanying hardware (640) using a virtual hardware interface that is the hardware visor, and could exist as a virtual hypervisor (shown as 420,430 in FIG. 6—which corresponds with but may not be identical to that shown in FIG. 4). In the case of FIG. 6, the operation of the managed securitized container device and system (400) is now enhanced by the utilization of both the statistics communication processor and either a hyper or real visor device that exists between the repositories (420, 430).

Figure 7:
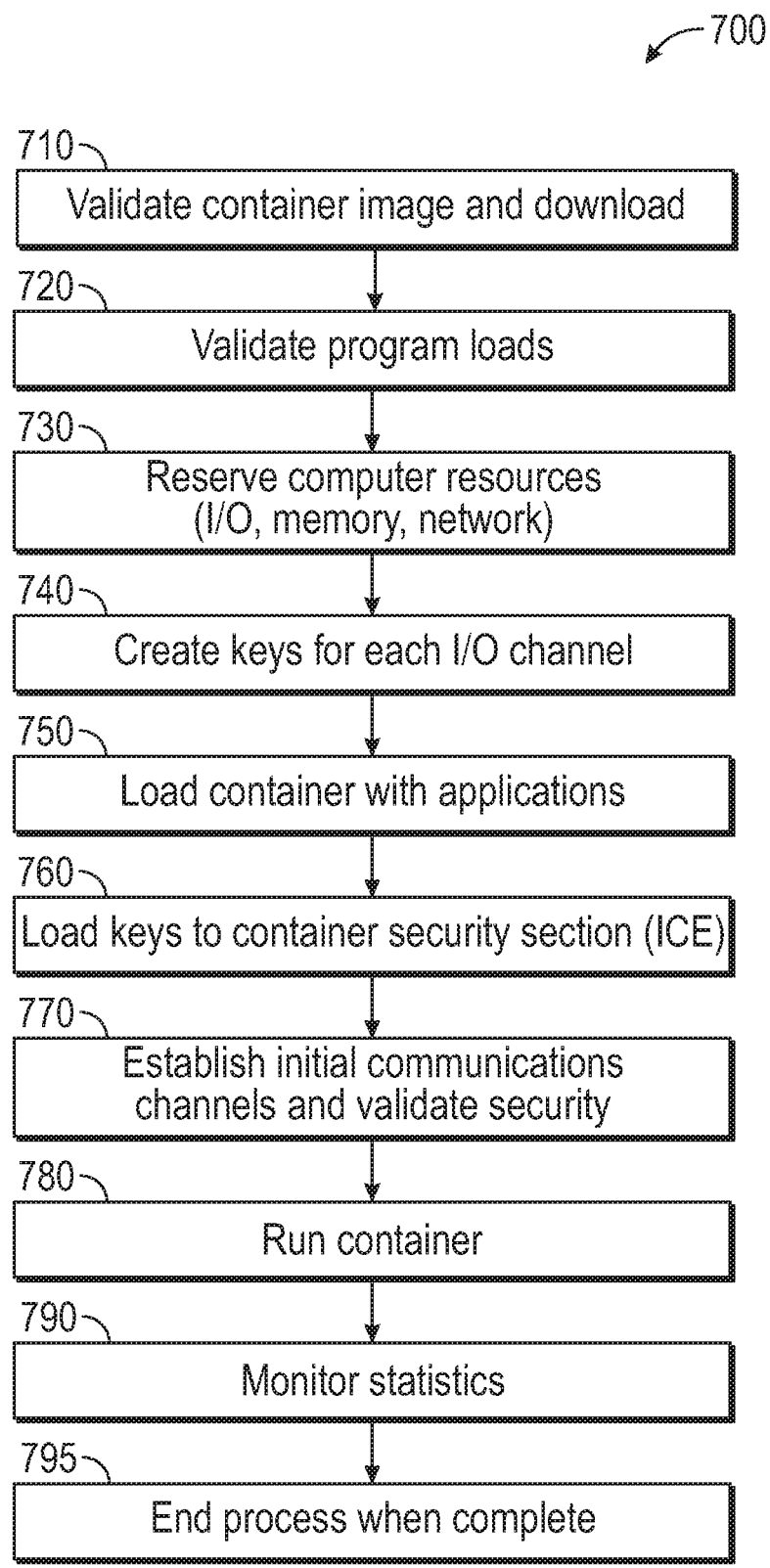
FIG. 7 is a flowchart that indicates the methodology for implementing the "ICEMicro" system for securitizing securitized containers.

FIG. 7, is a flow diagram that provides one actual methodology associated with using the managed securitized container device and system. In this case, initially the container image is validated and downloaded (710). Next a validated program is loaded (720) which often requires reserve computer resources including I/O—input output—interface(s), a memory, and network capabilities (730). To ensure the encryption is implemented, keys are created for each I/O channel (or tunnel), (740). This provides a transmissions path for loading containers with software applications that are protected by encryption described herewithin (750). Once the keys exist, they can be loaded to the container security portions (known herein as ICEMicro), (760). This leads to establishment of initial communications channels (tunnels) and allows for validation that security has been implemented (770).

Finally, the use of the container is possible and it can be "run" so that its function in developing the software application can be completed (780). As the methodology and system (700) is proceeding, statistics involving all aspects of the system including all securitization and encryption can be monitored (790). This leads to understanding and being notified when using the managed securitized container device and system has been completed (795).

The availability of such a system allows for stronger security regarding the degree of confidentiality with more confidence. Employing this system further establishes the goal to help encryption systems develop a larger acceptance reputation. Such acceptance provides a consequent increase in usage and a worldwide strengthening of data communications, electronic mail, and commercial electronic transactions.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

The computer readable media described within this application is non-transitory. The transmission of data is transmitted via signals that are non-transitory signals. In addition, each and every aspect of all US Provisional Applications and US Non-Provisional applications as well as any of the cited granted patents listed above are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. A system for using one or more securitized software container management devices, comprising:
one or more securitized software container management devices further comprising at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory, at least one control plane, at least one trust plane, and at least one software container, wherein controller logic that exists within said control plane transfers signals along a single path to said trust plane or to said software container, or both said trust plane and said software container, and wherein said signals continue traveling through said control plane to said trust plane or said software container, or both said trust plane and said software container, and wherein said signals are securitized or encrypted, or both securitized and encrypted either before, or as, said signals are entering said at least one software container;

wherein said system for using said one or more securitized software container management devices is combined with one or more access devices or one or more user devices, or both one or more access devices and one or more user devices further comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; one or more real or one or more virtual master distributed auto-synchronous array (DASA) databases or both one or more real and one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, and wherein said master and said partial DASA databases for configure bi-directional transmission of data to and from multiple partial user devices, to and from multiple partial access devices or to and from both multiple partial user and multiple partial access devices, wherein said user devices and said access devices are computing devices, wherein one or more partial user and one or more partial access devices store and provide at least partial copies of portions of said master DASA databases, and wherein said master DASA databases, said partial DASA databases or both said partial DASA databases and said master DASA databases are linked and communicate with each other as well as inclusion of one or more logging and monitoring databases that provide statistical and numerical calculations utilizing data, wherein said one or more access devices authenticate using a first set of computing operations, and validate using a second set of computing operations, and wherein a third set of computing operations controls access for a specified set of users, wherein said computing operations define rules utilized to provide logic with regard to communications between said master and said partial DASA databases and said partial user and said partial access devices.

2. The system of claim 1, wherein use of a software container occurs after securitization and encryption is complete in which a software container's function in developing a software application is completed in a secure manner.

3. The system of claim 2, wherein as said securitized software container management devices are created and subsequently discarded, and wherein statistics involving all securitization and encryption data at rest and data in transit is monitored, thereby leading to full comprehension regarding notification when a securitized software container management device and system is used.

4. The system of claim 1, wherein access control devices of said system further operate by transmission of a credential identifier to an access control server when said access control devices are determined to be operating, a local authentication processor configured to authenticate said credential identifier against entries of one or more keys existing within tables when an access control system is determined to be operating and a input/output processor configured to send a signal to a secured area when said credential identifier has been successfully authenticated; wherein a communication transceiver includes an interface to serve second data that can be displayed to both an user external to said access control devices and displayed on said access control devices themselves.

5. The system of claim 4, wherein data is transmitted to a secured area such that said data is transmitted and received by a cellular phone.

6. The system of claim 4, wherein if access is allowed, a user's device provides use of oral, visual, or text data on a display, as a message that indicates a match so that an user is allowed access.

7. The system of claim 6, wherein if access is denied, said user's device provides use of an oral, visual, or text data on a display as a message of denial of said match indicating that said user is denied access.

8. The system of claim 7, wherein denial of said match causes an encryption application on said user's device to be removed and wherein to ensure that master keys in a user table are secured, a new master key in said user table is generated either via a signal from said user's device to one or more secured encryption databases or via a signal from a key management system to said one or more secured encryption databases.

9. The system of claim 1, wherein a key management system is a system that provides one or more keys for encryption or decryption or both encryption and decryption as required by said securitized software container management devices.

10. The system of claim 1, wherein said securitized software container management devices control access to an enclosed area from a group consisting of a building, a room within a building, a cabinet, a parking lot, a fenced-in region, and an elevator.

11. The system of claim 1, further comprising a signal converter coupled to a communications processor that receives and transmits data as signals, wherein said communications processor is agnostic to a communication protocol of an access control server that is also a portion of said securitized software container management devices.

12. The system of claim 11, wherein said signal converter is agnostic to a communication protocol of a local authentication processor.

13. The system of claim 12, wherein said signal converter interfaces with a plurality of access controllers.

14. The system of claim 13, wherein a communication transceiver is provided for said partial user device or said partial access device or both and includes at least one of the group consisting of: a serial interface, a TCP/IP interface, an IEEE 802.11 interface, an IEEE 802.15.4 interface, and a secure HTTP interface.

15. The system of claim 14, wherein said communication transceiver is configured to transmit a credential identifier to access a control server via a wireless communication link.

16. The system of claim 15, wherein said communication transceiver receives said credential identifier from a radio-frequency identification (RFID) transponder included in an access control card.

17. The system of claim 1, wherein operational modes of said securitized software container management devices include at least one of a synchronous mode and an asynchronous mode.

18. The system of claim 1, wherein data transmitted to an access control server is encrypted and wherein a credential identifier is transmitted to an access control server via a wireless communication link.

19. A system for providing one or more securitized software container management devices, comprising
one or more securitized software container management devices further comprising at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory;
initializing a software container image that is validated and downloaded onto or into at least one software container, wherein a validated program is loaded onto said software container that requires reserve computer resources including one or more input/output interface(s), a memory, and network capabilities where encryption of container-related data at rest or container-related data in transit is implemented by utilizing dynamically changing keys created for each input/output tunnel and/or for each software container utilizing said input/output tunnel that are providing transmissions path(s) for loading software containers with software applications protected by said encryption;
wherein said securitized software container management devices are combined with one or more access devices or one or more user devices, or both one or more access devices and one or more user devices further comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; one or more real or one or more virtual master distributed auto-synchronous array (DASA) databases or both one or more real and one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, and wherein said master and said partial DASA databases configure bi-directional transmission of data to and from multiple partial user devices, to and from multiple partial access devices or to and from both multiple partial user and multiple partial access devices, wherein said user devices and said access devices are computing devices, wherein one or more partial user and one or more partial access devices store and provide at least partial copies of portions of said master DASA databases, and wherein said master DASA databases, said partial DASA databases or both said partial DASA databases and said master DASA databases are linked and communicate with each other as well as inclusion of one or more logging and monitoring databases that provide statistical and numerical calculations utilizing data, wherein said one or more access devices authenticate using a first set of computing operations, and validate using a second set of computing operations, and wherein a third set of computing operations controls access for a specified set of users, wherein said computing operations define rules utilized to provide logic with regard to communications between said master and said partial DASA databases and said partial user and said partial access devices.

20. The system of claim 19, wherein said keys are loaded into or onto software container security portions of said software containers thereby leading to establishment of initial communications tunnels and allowing for validation that security has been implemented.

* * * * *